(12) United States Patent
Bang et al.

(10) Patent No.: US 10,665,222 B2
(45) Date of Patent: May 26, 2020

(54) METHOD AND SYSTEM OF TEMPORAL-DOMAIN FEATURE EXTRACTION FOR AUTOMATIC SPEECH RECOGNITION

(71) Applicant: Intel Corporation, Santa Clara, CA (US)

(72) Inventors: Suyoung Bang, Hillsboro, OR (US); Muhammad Khellah, Tigard, OR (US); Somnath Paul, Hillsboro, OR (US); Charles Augustine, Portland, OR (US); Turbo Majumder, Portland, OR (US); Wootaek Lim, Ann Arbor, MI (US); Tobias Bocklet, Munich (DE); David Pearce, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/022,376

(22) Filed: Jun. 28, 2018

(65) Prior Publication Data

US 2019/0043477 A1 Feb. 7, 2019

(51) Int. Cl.
| | |
|---|---|
| *G01L 15/00* | (2006.01) |
| *G10L 15/02* | (2006.01) |
| *G10L 25/03* | (2013.01) |
| *G10L 15/20* | (2006.01) |
| *G10L 25/24* | (2013.01) |
| *G10L 25/18* | (2013.01) |
| *G10L 25/09* | (2013.01) |

(52) U.S. Cl.
CPC .............. *G10L 15/02* (2013.01); *G10L 15/20* (2013.01); *G10L 25/03* (2013.01); *G10L 25/09* (2013.01); *G10L 25/18* (2013.01); *G10L 25/24* (2013.01)

(58) Field of Classification Search
None
See application file for complete search history.

(56) References Cited

U.S. PATENT DOCUMENTS

| | | | | |
|---|---|---|---|---|
| 5,353,026 | A  * | 10/1994 | Wilson | H03H 17/023 341/143 |
| 6,326,912 | B1 * | 12/2001 | Fujimori | H03M 3/412 341/110 |
| 7,007,053 | B1 * | 2/2006 | Malik | H03H 17/0223 708/300 |
| 9,412,373 | B2 * | 8/2016 | Ma | G10L 15/065 |
| 9,633,669 | B2 * | 4/2017 | Salvador | G10L 21/0202 |
| 2004/0037363 | A1 * | 2/2004 | Norsworthy | H03C 3/40 375/259 |
| 2004/0220804 | A1 * | 11/2004 | Odell | G10L 15/142 704/230 |

(Continued)

OTHER PUBLICATIONS

Memon et al., "Sigma-Delta Modulation based digital filter design techniques in FPGA", ISRN Electronics, vol. 2012, Art. ID 538597, Oct. 2012.*

(Continued)

*Primary Examiner* — Richard Z Zhu
(74) *Attorney, Agent, or Firm* — Green, Howard & Mughal LLP.

(57) ABSTRACT

A system, article, and method provide temporal-domain feature extraction for automatic speech recognition.

19 Claims, 18 Drawing Sheets

(56) References Cited

U.S. PATENT DOCUMENTS

| | | | |
|---|---|---|---|
| 2007/0050438 A1* | 3/2007 | Samuel ................. | G06F 9/3001 708/300 |
| 2007/0219796 A1* | 9/2007 | Huang ................. | G06K 9/6297 704/255 |
| 2009/0041367 A1* | 2/2009 | Mansour ............... | H03M 3/436 382/252 |
| 2017/0331490 A1* | 11/2017 | Maehata ................. | H03K 7/08 |
| 2018/0174575 A1* | 6/2018 | Bengio ................. | G10L 15/16 |

OTHER PUBLICATIONS

Amodei, D. et al., "Deep Speech 2: End-to-End Speech Recognition in English and Mandarin", Proceedings of Machine Learning Research, Jun. 2016.

Badami, K. et al., "Context-Aware Hierarchical Information-Sensing in a 6uW 90nm CMOS Voice Activity Detector", IEEE International Solid State Circuits Conf. (ISSCC) Dig. Tech. Papers, Feb. 2015.

Bowman, K.A. et al., "A 22nm all-digital dynamically adaptive clock distribution for supply voltage droop tolerance", IEEE J. Solid-State Circuits; vol. 48, No. 4; pp. 907-916; Apr. 2013.

Davis, S.B. et al., "Comparison of Parametric Representations for Monosyllabic Word Recognition in Continuously Spoken Sentences", IEEE Transactions on Acoustics, Speech, and Signal Processing, vol. ASSP-28, No. 4; pp. 357-365, Aug. 1980.

Fischer, T. et al., "A 90-nm variable frequency clock system for a power-managed Itanium architecture processor", IEEE J. Solid-State Circuits, pp. 218-228; Jan. 2006.

He, Q. et al., "An Adaptive Multi-Band System for Low Power Voice Command Recognition", Interspeech, pp. 1888-1892; Sep. 2016.

He, Q., "An Architecture for Low-Power Voice-Command Recognition Systems", PhD Thesis Dissertation; Jun. 2016.

Price, M. et al., "A Scalable Speech Recognizer with Deep-Neural-Network Acoustic Models and Voice-Activated Power Gating", IEEE International Solid State Circuits Conf. (ISSCC) Dig. Tech. Papers, Feb. 2017.

Price, Michael et al., "A 6mW, 5,000-Word Real-Time Speech Recognizer Using WFST Models", IEEE Journal of Solid-State Circuits, vol. 50, No. 1, pp. 102-112, Jan. 2015.

Raychowdhury, A. et al., "A 2.3 nJ/Frame Voice Activity Detector-Based Audio Front-End for Context-Aware System-On-Chip Applications in 32-nm CMOS", IEEE J. Solid-State Circuits, vol. 48, No. 8, Aug. 2013.

Schell, B. et al., "A Continuous-Time ADC/DSP/DAC System Wth No Clock and With Activity-Dependent Power Dissipation", IEEE J. Solid-State Circuits, vol. 43, No. 11, Nov. 2008.

Shah, M. et al., "A fixed-point neural network for keyword detection on resource constrained hardware", IEEE Workshop on Signal Processing Systems (SiPS), Oct. 2015.

Tokunaga, C et al., "A Graphics Execution Core in 22nm CMOS Featuring Adaptive Clocking, Selective Boosting and State-Retentive Sleep", IEEE International Solid State Circuits Conf. (ISSCC) Digital Tech. Papers; pp. 108-109; Feb. 2014.

* cited by examiner

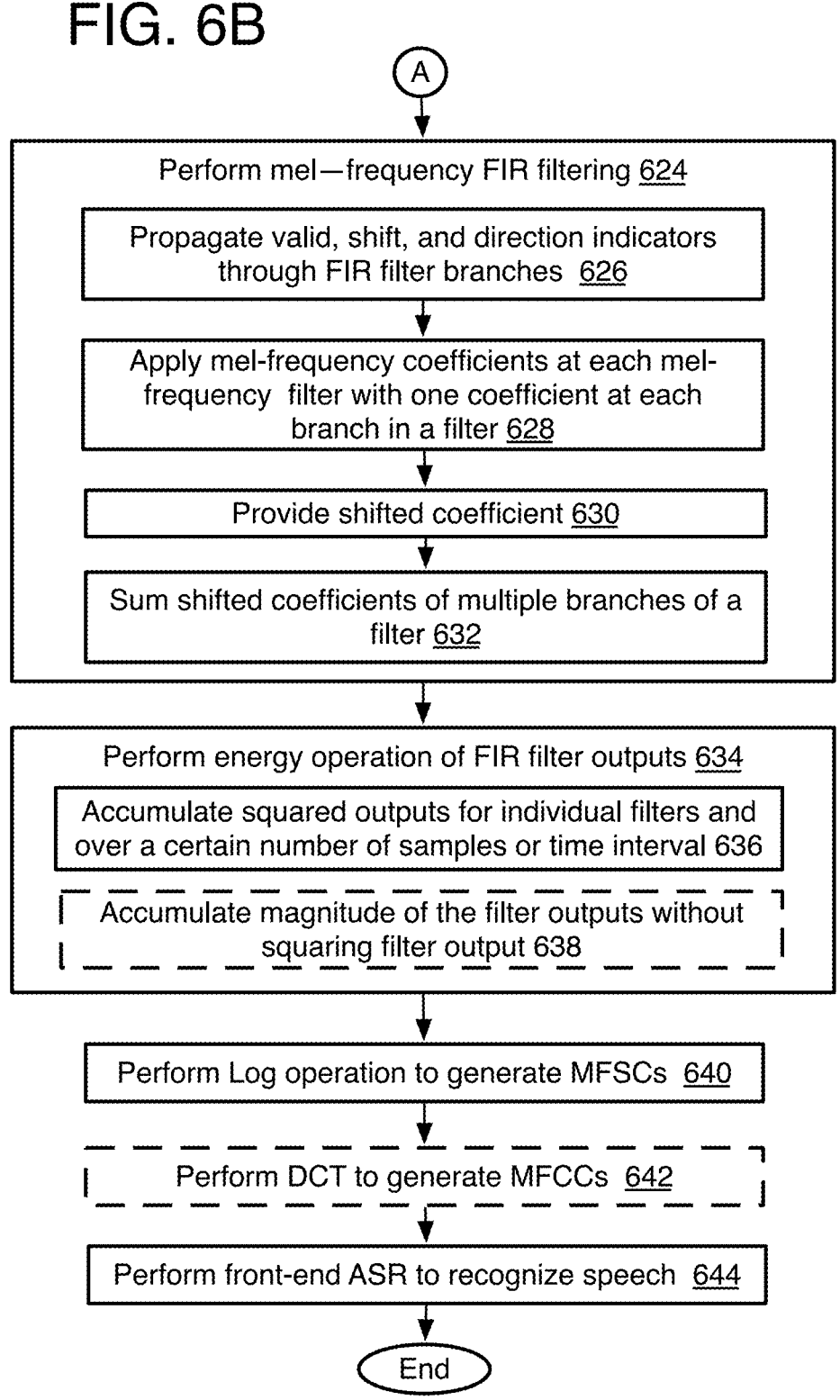

FIG. 13A MFSC 1300
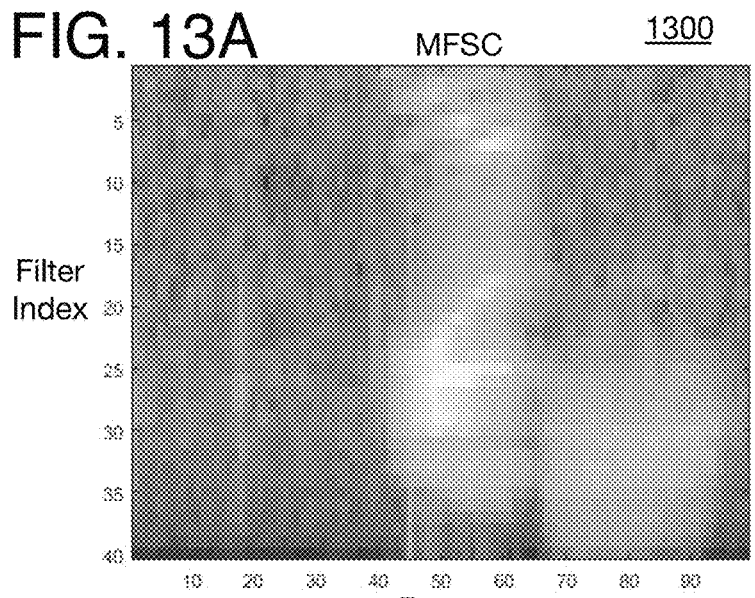
FIG. 13B Baseline T-MFSC w/Energy Oper. 1302
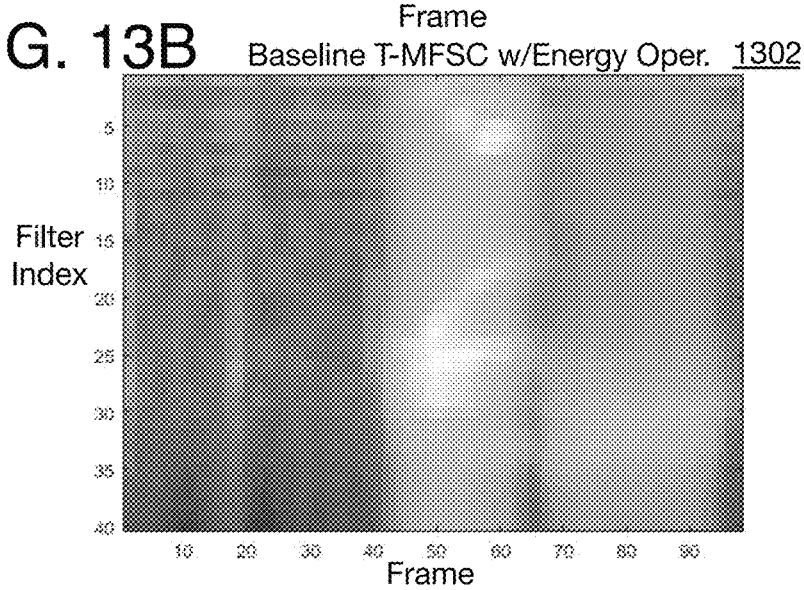
FIG. 13C Event-Driven T-MFSC w/Energy Oper. 1304
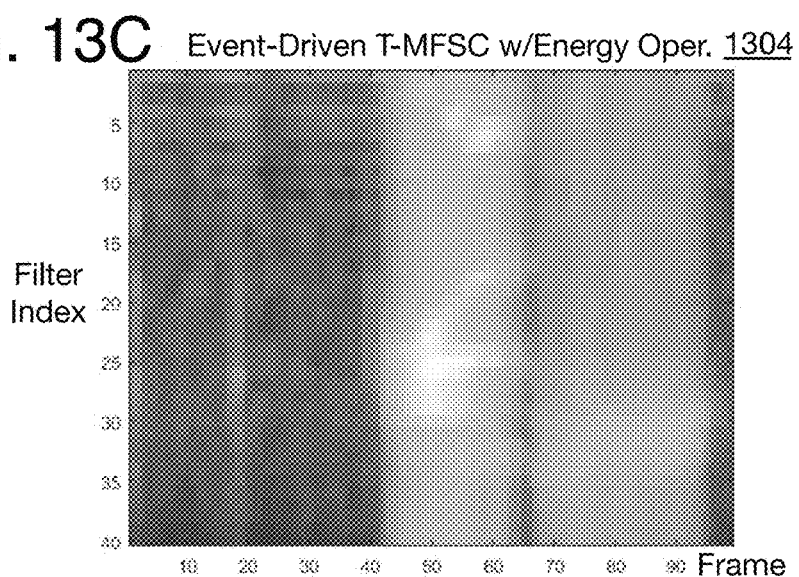

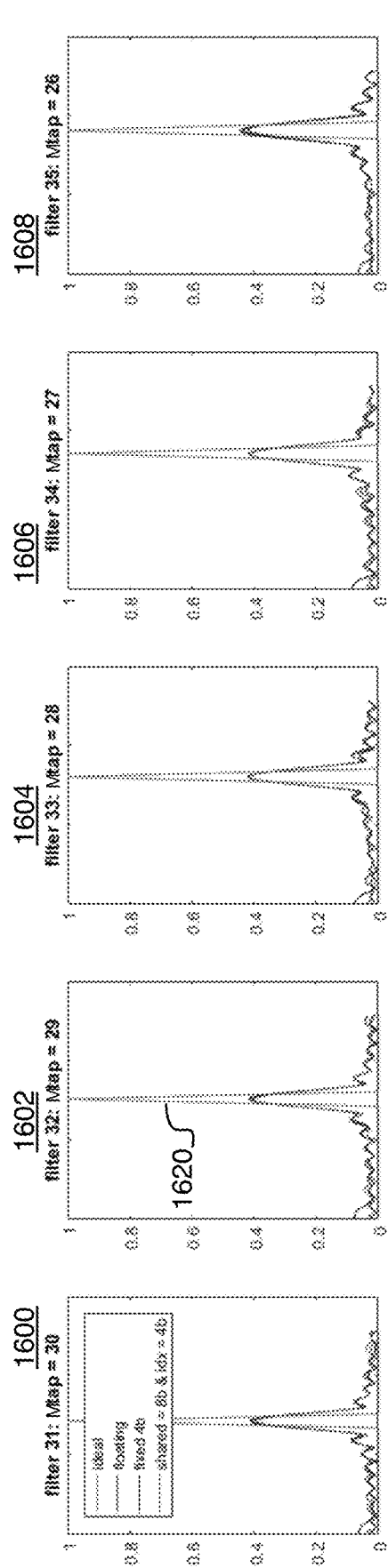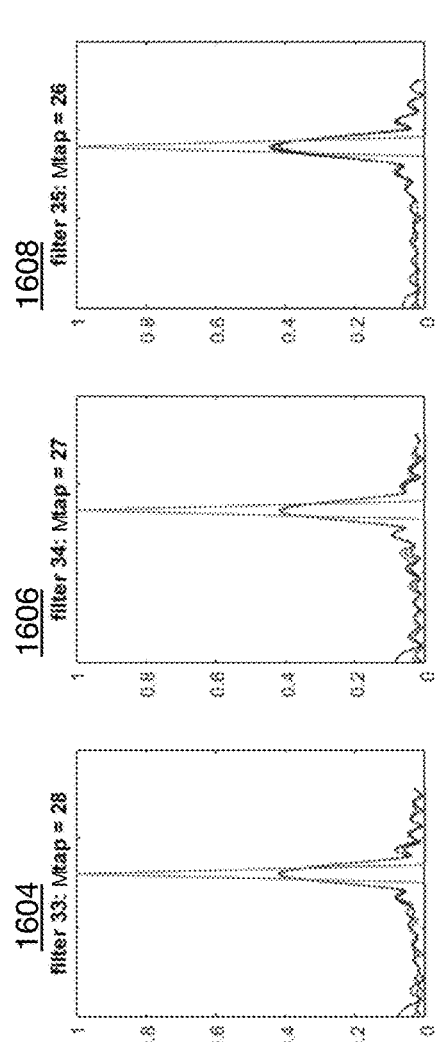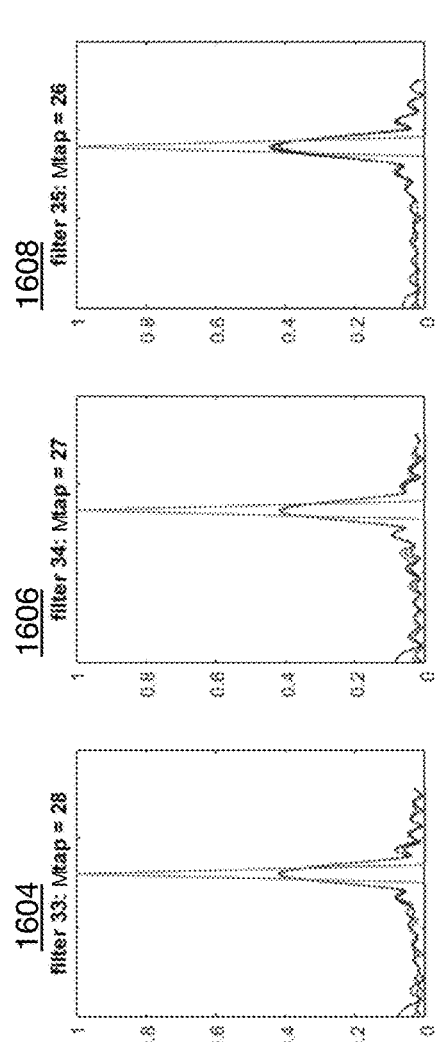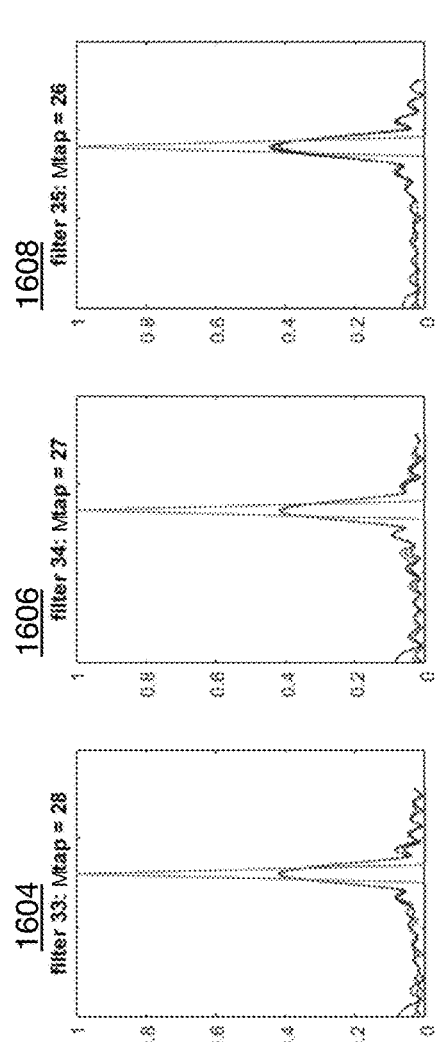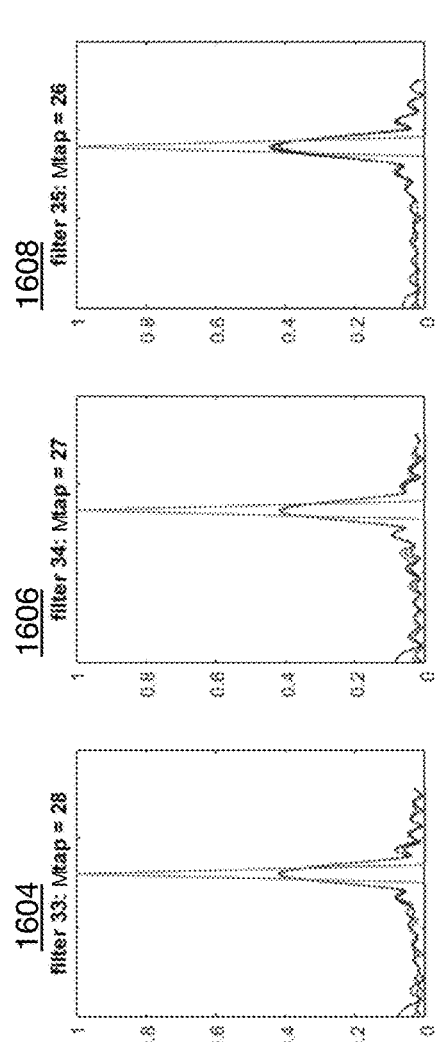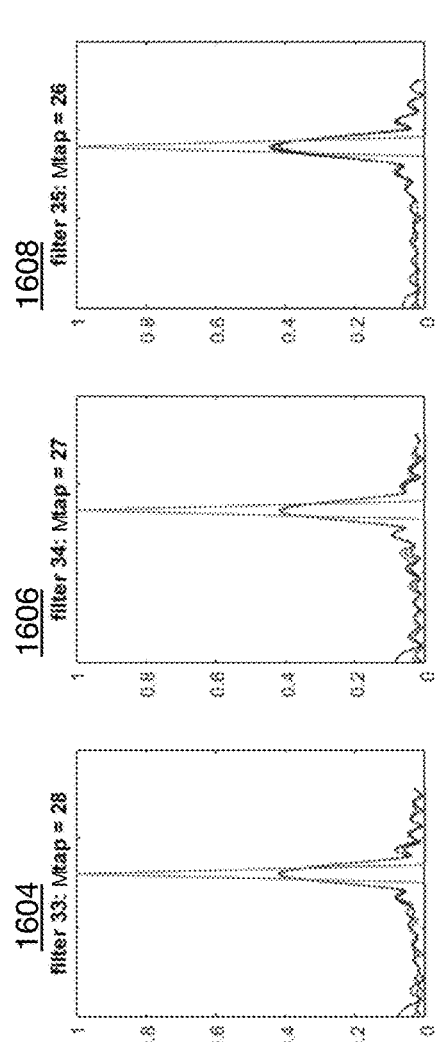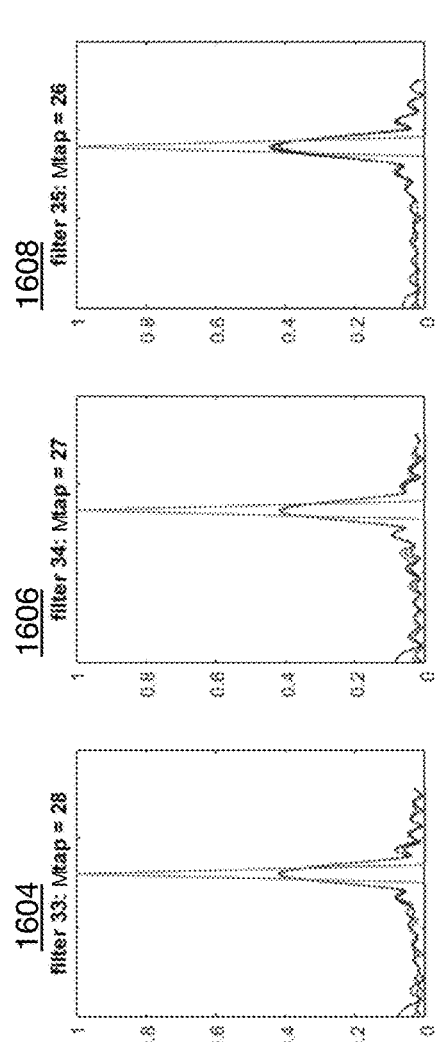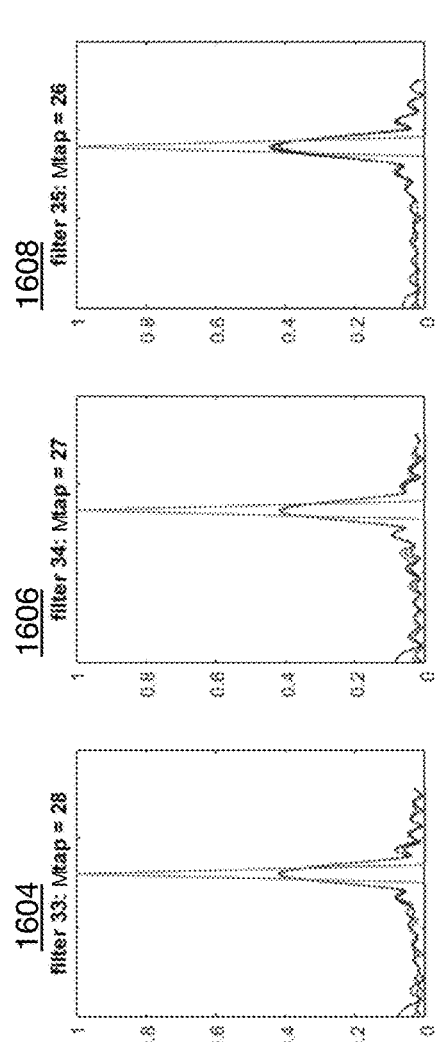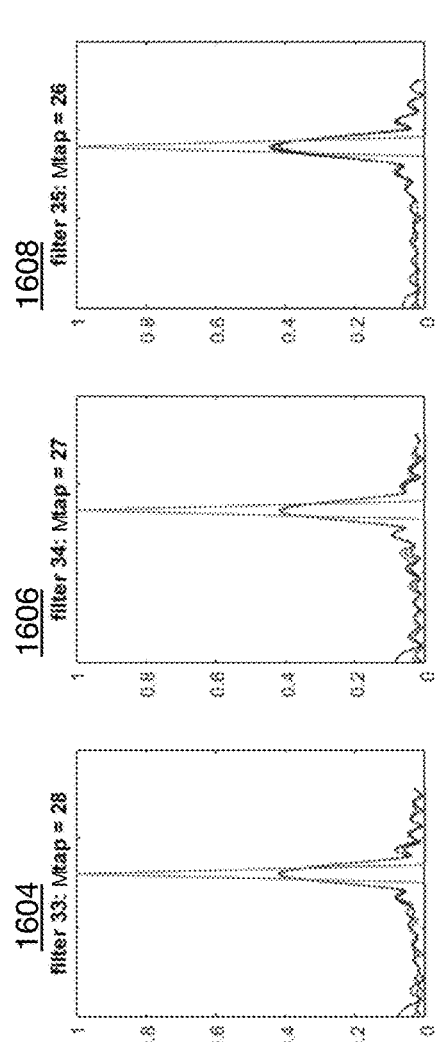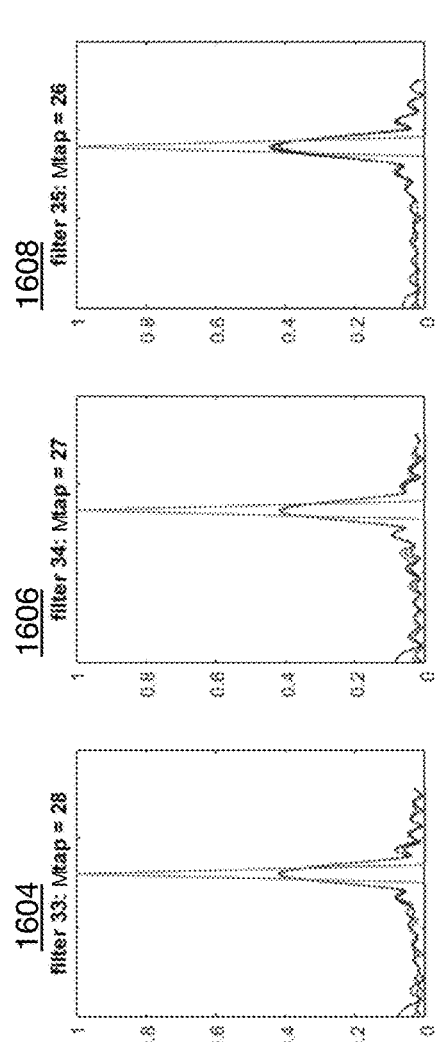

METHOD AND SYSTEM OF TEMPORAL-DOMAIN FEATURE EXTRACTION FOR AUTOMATIC SPEECH RECOGNITION

BACKGROUND

Speech recognition systems, or automatic speech recognizers, have become increasingly important as more and more computer-based devices use speech recognition to receive commands from a user in order to perform some action as well as to convert speech into text for dictation applications or even hold conversations with a user where information is exchanged in one or both directions. Such systems may be speaker-independent such as home or smartphone speech recognition systems where the system recognizes words no matter the speaker, or speaker-dependent where the system is trained by having the user repeat words. Some systems also may be configured to understand a fixed set of single word commands or short phrases, such as for operating a mobile phone that understands the terms "call" or "answer". Systems on smartphones, smart speakers, tablets, and other devices may have an extensive vocabulary such as for a virtual assistant that provides voice activated search engines and performs other audio-activated tasks.

Thus, automatic speech recognition (ASR) is desirable for wearables, smartphones, and other small devices. Many of these small devices with ASR systems have a limited memory, computational capacity, and battery capacity. The acoustic front-end feature extraction may have large computational loads and resulting power consumption mainly due to conventional, generic digital signal processors (DSPs) that perform fast Fourier transform (FFT) and other DSP tasks for feature extraction. Feature extraction becomes even more important for always-on ASR systems in which feature extraction, voice activation (VA), and simple keyword detection (KWD) are constantly performed before executing other subsequent ASR back-end complicated tasks, and therefore, the feature extraction, VA, and KWD are performed much more frequently than those ASR back-end complicated tasks thereby impacting energy consumption more directly. This can drain a significant amount of battery power and undesirably dominate the processing time that could be used for other ASR tasks or other non-ASR tasks on small devices.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 6A-6B is a detailed flow-chart of a method of temporal-domain feature extraction according to at least one of the implementations described herein;

FIGS. 13A-13C are spectrograms comparing conventional frequency-domain feature extraction with temporal-domain mel-frequency feature extraction with an energy operation and with a magnitude sum of FIR filter output according to Parseval Theorem and according to at least one implementation herein.

FIGS. 16A-16J are each a graph of results from a different filter each with a different number of coefficients and comparing ideal mel-frequency filters and transfer functions with coefficients that are shared and unshared, two different precision sizes, and either floating-point or fixed-point precision;

DETAILED DESCRIPTION

Figure 1:
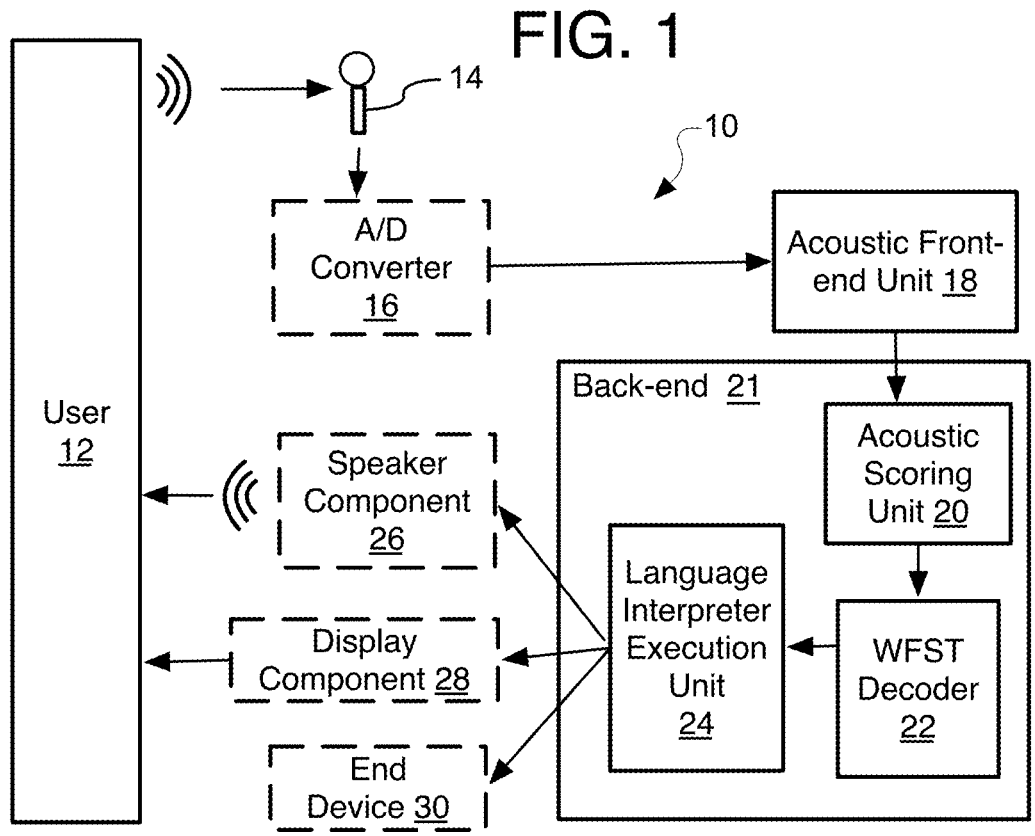
FIG. 1 is a schematic diagram showing an automatic speech recognition system.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes, except when specific architecture is mentioned herein. For instance, various architectures employing, for example, multiple integrated circuit (IC) chips and/or packages, and/or various computing devices and/or consumer electronic (CE) devices such as laptop or desktop computers, mobile devices such as smart phones or wearables such as a smart watch, smart glasses, or exercise band, video game panels or consoles, television set top boxes, dedicated residential or commercial smart speakers, internet of things (IoT) devices, on-board vehicle systems, dictation machines, physical or computer access security systems, environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

A machine-readable medium also may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of temporal-domain feature extraction for automatic speech recognition.

Referring to FIG. 1, a speech enabled human machine interface (HMI) record audio with a microphone, process the acoustic data with a speech processing device and then output speech or visual information to the user or other application to perform a further action depending on the audio information. An automatic speech recognition (ASR) system or HMI 10 may be used with the implementations described herein and may have an audio capture or receiving device 14, such as an analog or digital microphone for example, to receive sound waves from a user 12, and that converts the waves into a raw electrical acoustical signal that may be recorded in a memory. The system 10 may optionally have an analog/digital (A/D) converter 16, which could be part of a digital microphone, but otherwise separate from an acoustic front end 18 to provide a digital acoustic signal to the acoustic front-end unit 18. As explained below, instead, the acoustic front-end 18 may receive an analog input speech signal, and the ADC tasks may be performed by the acoustic front-end unit 18 itself in some of the implementations described below.

The acoustic front-end unit 18, also referred to herein as a feature extraction unit, may perform feature extraction to provide acoustic features or feature vectors in the form of mel-frequency spectral coefficients (MFSC) or cepstrum coefficients (MFCC). In the conventional form, windowing and fast Fourier transform (FFT) are used to form the coefficients, and for ASR analysis, the front-end unit 18 also may divide the acoustic signal into overlapping frames with 25 ms-long frames and 10 ms frame strides by one example. In contrast, the present methods described herein reduce or eliminate these techniques, and divide the acoustic signal into non-overlapping frames with 25 ms-long frames and 25 ms frame strides by one example. More details are provided below.

The ASR system 10 also may have a back-end 21 with an acoustic scoring unit 20 that uses the feature coefficients to determine a probability score for the context-dependent phonemes that are identified in the input signal. Some acoustic scoring units are expecting mel-frequency cepstrum coefficients, mel-frequency spectral coefficients, or both. The acoustic scoring units may use neural networks or other techniques to provide the acoustic scores.

A weighted finite state transducer (WFST) unit or decoder 22 uses the acoustic scores to identify one or more utterance hypotheses and compute their scores. The WFST decoder 22 may use a neural network of arcs and states that also are referred to as WFSTs. The WFST neural network or other networks may be based on hidden Markov models (HMMs), dynamic time warping, and many other network techniques or structures. The WFST decoder 22 uses known specific rules, construction, operation, and properties for single-best or n-best speech decoding, and the details of these that are not relevant here are not explained further in order to provide a clear description of the arrangement of the new features described herein.

The decoding results are made available to a language interpreter and execution unit (or interpretation engine) 24 to determine the user intent. This intent determination or spoken utterance classification may be based on decision trees, form filling algorithms, or statistical classification (e.g. using support-vector machines (SVMs) or deep neural networks (DNNs)).

Once the user intent is determined for an utterance, the interpretation engine 24 also may output a response or initiate an action. The response or answer may be in audio form through a speaker component 26, or in visual form as text on a display component 28 such as internet search results for example. Otherwise, an action may be initiated to control another end device 30 (whether or not considered as part of, or within, the same device as the speech recognition system 10). For example, a user may state "call home" to activate a phone call on a telephonic device, the user may start a vehicle by stating words into a vehicle fob, or a voice mode on a smart phone may perform certain tasks on the smart phone. The end device 30 may simply be software instead of a physical device or hardware or any combination thereof, and is not particularly limited to any one type of device or operation thereof except to have the ability to understand a command or request resulting from a speech recognition determination and to perform or initiate an action in light of that command or request.

Figure 2:
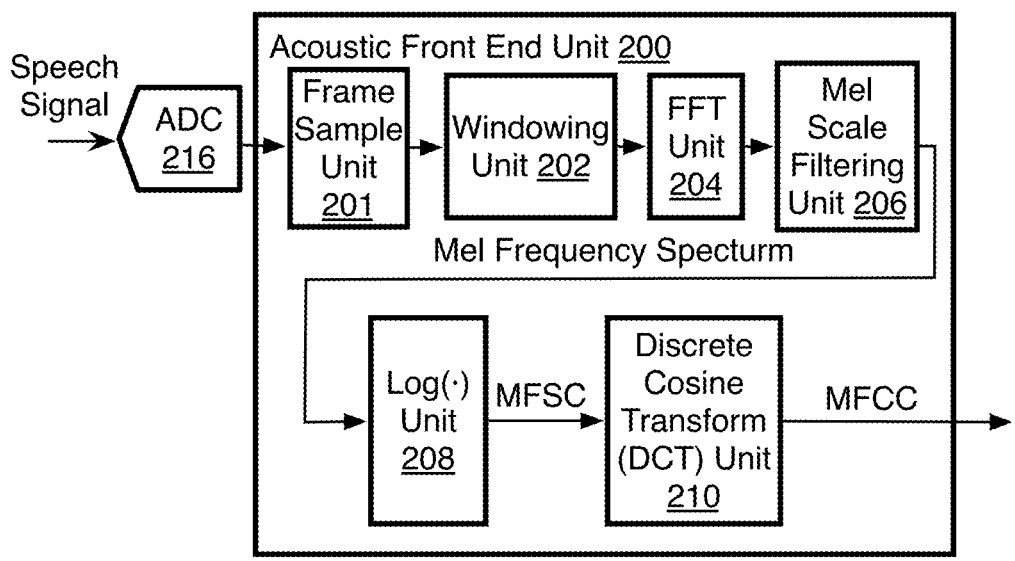
FIG. 2 is a schematic diagram of a conventional automatic speech recognition system with a frequency-domain feature extraction at an acoustic front end of the system.

Referring to FIG. 2, a conventional automatic speech recognition (ASR) system or pipeline may have a conventional acoustic front end (or feature extraction) unit 200. The feature extraction unit 200 may receive a digital signal converted from analog by an ADC 216 for example, and then the feature extraction unit 200 ultimately provides acoustic feature coefficients to an acoustic scoring unit. By one example, the feature extraction unit 200 provides the coefficients in the form of mel-frequency spectral coefficients (MFSC) and/or Mel-frequency cepstral coefficients (MFCC).

Once a digital speech signal is received, a frame sample unit 201 takes samples of the input speech signal at a certain frequency to form frames, and at overlapping time intervals. Then, a windowing unit 202 refines the input speech signal on each frame to be compatible with fast Fourier transform (FFT) performed by an FFT unit 204 to convert the signal into the frequency domain. Typically, these frames must be overlapped because the FFT operations will suppress the signal at the edges or boundary (start and end) of each frame. Specifically, the FFT operations assume the incoming signal is periodic, and therefore suppresses the signal as it extends away from a center of the frame so that a single peak is formed on the middle of the frame and that is desired for analysis for each frame or window. Typically, one suppression technique used is a hamming window that applies certain frequency curve-shaping constants. The suppressed data that is still undesirably non-zero near the start and end of a frame is referred to as data spectral leakage. The timing intervals of the frames, or windows, are set to overlap to compensate for the loss due to the windowing so that a boundary region of one frame is placed near the center of another frame, thereby the FFT unit can more accurately determine the frequencies of the suppressed part of each window and of the signal.

The FFT unit 204 then provides a FFT frequency spectrum (frequency values) of the input signal to a mel-spaced filter unit (or mel-scale filtering unit) 206 that performs the mel-frequency filtering of the frequency values in the frequency-domain. Mel-frequency filtering is intended to reflect the filtering of the human ear, and the mel-frequency filters are non-uniformly spaced on the frequency-domain, with more filters in a low frequency region and less filters in a high frequency region. A formula for conversion of frequency domain to mel-scale frequency domain is mel(f)=1125×ln (1+f/700), where mel(f)=mel-scale frequency and f=frequency. Mel-spaced filters are triangular-shape filters equally spaced in the mel-frequency domain, and the number of mel-filters determines a dimension of the MFSC and MFCC. Energy of each filter is then calculated by summing of squares of initial filter output samples in a frame at each mel-filter.

Each mel-filter then provides the energy values as an output from the mel-scale filtering unit 206 and provided to a Log(*) unit 208 to generate the MFSCs. The MFSCs also may be provided to a discrete cosine transform (DCT) unit 210 to transform the MFSCs into MFCCs. The DCT unit 210 converts MFSCs into a sum of cosine functions oscillating at different frequencies, thereby performing a transform of the MFSCs from a frequency domain into a time-like domain (quefrency domain), resulting in compressed values representing the MFSCs as MFCCs that may be efficiently used for acoustic scoring. The MFCCs, the MFSCs, or both, are then provided to an ASR back-end unit, or more specifically, an acoustic scoring unit, to provide scores for the subsequent language models.

One disadvantage of the use of the FFT-based feature extraction is the large computational load required to operate in the frequency-domain. The FFT operation includes memory transactions for loading the audio data into, and fetching the data from, a memory buffer to perform the windowing to refine the signal of each frame, perform the FFT conversion into the frequency domain for each frame, and perform the mel-scale frequency filtering for each mel-filter in the frequency domain, and for each frame. The FFT operations themselves include multiple multiply-accumulate (MAC) operations being performed to accomplish complex number computations, log operations, and other steps that include multiplication (see table 1 below discussed with the results of the method disclosed herein for example).

Another disadvantage of the FFT feature extraction system is the result of the windowing itself. The overlapping windows, and in turn the need for more frames, caused by the windowing, results in a significant computational load burden as well as greater power consumption to perform feature extraction and back-end ASR. For example, one known system uses 25 msec-long frames with 15 msec overlapping region between two adjacent frames, so it requires 31 frames for 325 msec context window for a keyword spotting task, rather than about a mere 13 frames if the frames could be formed without an overlap. See Shah, M et al., "A fixed-point neural network for keyword detection on resource constrained hardware," IEEE Workshop on Signal Processing Systems (SiPS), pp. 1-6, (2015).

Also, since these FFT-related operations are performed for all frames in a sequence of audio frames, even those frames with unrecognizable signals or non-speech signals are processed. Thus, alternative techniques that can avoid at least the FFT operations to reduce the number of computations being performed for feature extraction is desired to reduce the amount of computations and in turn reduce the power consumed, especially for small untethered devices that are operating on limited battery.

The use of the FFT technique also requires a relatively large memory capacity with an input buffer to hold all of the windowed signal data, an FFT Coefficients buffer to be used for the transformation, and an FFT buffer to hold intermediate values provided for mel-frequency filtering (see table 2 below with the analysis of the results of the disclosed method). Here, the excessively large required memory capacity itself is the issue in addition to the number of required memory transactions that add to the computational load as mentioned above.

The computational load and the large memory needed to support FFT feature extraction results in a FFT feature extraction technique that is not scalable (or more accurately, scales inefficiently) with the addition of every mel-frequency filter that is provided. This is due to the fact that relatively larger computation costs of FFT operations are required compared to mel-frequency filtering operations. Thus, when smaller number of mel-filters are used for simple tasks, FFT computation is dominant in total computation cost of feature extraction. This disadvantage, reduced herein by the present temporal-domain feature extraction, is explained with the graph 1700 (FIG. 17) below as well.

Thus, conventional approaches for the computation of MFCCs and MFSCs have drawbacks in scalability and power consumption mainly due to FFT operations, which is not scalable with speech recognition task complexity, and is expensive in computation cost. For simple tasks such as voice activity detection and keyword spotting, MFCC and MFSC operations become significant in system power consumption due to the large number of FFT operations required.

One attempt to resolve the issues mentioned above was to use an analog system rather than a digital system. In such as system, an analog-domain feature extractor was proposed with analog-domain amplifiers and filters as an alternative approach to compute acoustic features, eliminating FFT operations. However, such analog circuit configurations pose design challenges because analog circuits are more prone to CMOS technology process variation, voltage variation, and temperature variation. Also, it is known that digital circuits are much easier to be ported from a CMOS technology process into a different CMOS technology process. See Badami, K et al., "*Context-Aware Hierarchical Information-Sensing in a 6 µW 90 nm CMOS Voice Activity Detector,*" IEEE International Solid State Circuits Conf. (ISSCC) Dig. Tech. Papers, pp. 430-431 (2015).

Another attempt to resolve the issues mentioned above eliminates the use of the FFT by using a continuous-time delta-modulator to perform ADC and provide tokens that indicate when voltage of the input signal has become higher than a high voltage boundary signal or lower than a low voltage boundary signal, thereby indicating the input signal has changed by a single least significant bit (LSB). The tokens also provide a bit to indicate which direction the input signal has changed (up or down). This is referred to as "level crossing sampling" or "time code modulation". This is performed in continuous time rather than discrete time to remove quantization noise at the end of the process (during analog to digital conversion (ADC)). See Schell, B. et al., "A Continuous-Time ADC/DSP/DAC System With No Clock and With Activity-Dependent Power Dissipation," IEEE J. Solid-State Circuits, vol. 43, no. 11, pp. 2472-2481 (2008).

The difficulties with the Schell approach is that only using a single range of voltages with a high and low voltage boundary in the delta modulation to determine whether the input signal has changed a single LSB results in too many activities. This is inadequate because it cannot efficiently process an input speech signal that has changed multiple LSBs during a single sample time interval (represented by a single token). In Schell, this can only be performed over multiple tokens, changing the LSB level by one with each sample when a large continuous rise or fall in the input speech signal occurs. For example, say a quick rise in input signal of five voltage LSBs occurs in less than 10 ms (a single sample time interval) and then the signal flattens. In Schell, each sample will merely indicate a one LSB rise in the signal so that five tokens (or time intervals) are needed to indicate the total five LSB rise in the signal. In Schell, each token requires delta-modulation indicators and FIR filtering as well as the Mel-frequency filtering and so forth to provide the MFSC and/or MFCC coefficients, thereby unnecessarily and significantly increasing the total computational load to provide that five LSB rise in the signal. Multiple level indication during a single output in Schell is not an option because this would require discrete time (DT) operation that uses a clock in order to synchronize the testing of multiple levels. The result is a single-level system that unnecessarily generates a computational load that is still too large, thereby still consuming too much processor time and battery power of a computing device.

Another attempt at increasing the efficiency of feature extraction without FFT uses 1-d convolution FIR filters and max pooling to perform the feature extraction. See Y. Hoshen, et al., "Speech Acoustic Modeling From Raw Multichannel Waveforms" in IEEE ICASSP, pp. 4624-4628 (2015). Such a system, however, still has difficulty with accuracy.

To resolve the issues mentioned above, the present method proposes temporal-domain filtering and energy computation of acoustic features in digital temporal-domain without FFT operations to provide frequency-domain signal values for mel-frequency filtering. This allows for acoustic feature extraction at significantly reduced computational cost as well as a reduced memory requirement as a part of an end-to-end speech recognition pipeline. The present method (referred to as a T-MFSC method) makes it possible to perform simple to sophisticated speech recognition tasks without the large computational loads of the FFT technique.

Also, the present event-driven T-MFSC methods have feature extraction units (FEUs) that may perform multi-level delta-modulation in discrete-time (DT) in contrast to the prior work with single-level delta-modulation in continuous-time (CT) as in Schell, B., et al. cited above. The multi-level property of the discrete time delta-modulation allows for operation at the Nyquist sampling rate, but without using an oversampling frequency, and without complex CT circuits. At the same time, the feature extraction uses event-driven FIR filters, which performs certain computations only when an event arises. Thus, the present method uses discrete time (DT) operations that avoid asynchronous circuits of Schell, thereby eliminating or reducing CT circuit configuration challenges and constraints. Also, as mentioned, DT operation here better ensures that the FIR filters are not excessively triggered regardless of magnitude of an input change.

Thus, first, and by one form, the present method may eliminate FFT operations that provide signal frequencies for mel-frequency filtering by directly extracting "events" from incoming voice data and processing them directly in event-driven FIR filters. This significantly reduces the computational load since FFT operations are eliminated thereby eliminating the FFT operations including FFT multiplication operations, and not every frame (or time interval) is FFT processed to provide data for filtration, only those time intervals with events will be used in computations at the FIR filter to contribute to filter outputs.

Second, multi-level delta-modulation further reduces the number of time intervals (or samples) with events, and in turn, the number of samples requiring mel-frequency filtering and feature extraction coefficients. This is a very large reduction in the number of samples that must be processed in contrast to the Schell system.

Third, by another form, the present method may replace multiplication operation of the FIR filters with binary shift and additions. Therefore, the present T-MFSC method may reduce computation costs by 80% during filtering (for example, when the number of mel-frequency filters is 40, the event rate may drop to about 0.4).

Fourth, and by yet a further form, the present T-MFSC method may eliminate windowing and the overlapping of adjacent frames. For the current process, the system analyzes a continuous signal during delta modulation, and is not divided into frames until an accumulator operation by one example. Thus, when one frame ends, the next frame begins avoiding redundant processing of overlapped regions. By example, the present T-MFSC method may merely process the original 13 (325/25) frames for 325 msec context window for the same task using 31 frames as mentioned above in the conventional FT process. The lower number of frames that needs to be processed by T-MFSC (about 60% of the conventional MFSC technique in this example) will lead to a large reduction in speech features produced, thus reducing total computation energy (or computational load) not only in the front-end of the speech pipeline, but also at the back-end speech processing unit (e.g., neural network of the acoustic scoring, language modeling, and so forth).

In order to enable the delta-modulation and FIR filtering in the temporal domain while providing the ASR back-end with coefficients (such as MFSCs and/or MFCCs) that relate to the frequency-domain as may be required, an accumulator may be used that performs an energy operation according to Parseval's Theorem to provide intermediate coefficient values that are in a form to be converted to MFSCs. The explanation of Parseval's theorem is provided below. The accumulator that receives and accumulates the FIR filter output enables the use of the delta-modulation and FIR filtering in the temporal-domain while providing coefficients that are related to the frequency domain as may be needed by the ASR back-end. Specifically, according to Parseval's Theorem, the sum of squared samples in the time-domain equals sum of squared samples in the frequency domain because energy is preserved between the time-domain and the frequency domain, and energy is obtained as sum of squared samples in a sequence.

In yet another option that mainly takes advantage of the Parseval accumulator, a baseline T-MFSC implementation may be used that provides the acoustic signal inputs to a conventional FIR filter that is not event driven, and without the delta modulation providing the input to the filter. By yet another form, the single level (or bounded voltage range) delta modulation of Schell may be performed with the event-driven filter as described herein (or as in Schell) which then provides the filter output to the Parseval accumulator. The advantage of the baseline T-MFSC is that conventional FIR filters can be executed in a 1d-convolution, which may be used by neural network ASR acoustic scoring, so that such a system does not need a generic DSP for its calculations, unlike FFT-based feature extraction. Such a system also improves the accuracy of the ASR results compared to conventional 1d-convolution systems mentioned above. More details are provided below.

By yet another option, the present method may slightly relax the high quality requirements of the prior feature extraction systems by modifying the application of the Parseval Theorem. Specifically, the reduction in quality during ASR feature extraction is now acceptable due to now typically robust and accurate acoustic scoring, language modeling, and language interpretation that occurs subsequently in the back-end of the ASR pipeline and can compensate for drops in quality during the ASR feature extraction. This permits the use of techniques that significantly reduce the computational load of feature extraction. For example, the present method is at least partially based on Parseval's theorem by accumulating the FIR filter outputs without strictly using the higher computational load of the exact Parseval equation (the squares are omitted) as explained below.

With this configuration, the present T-MFSC method reduces the memory requirement compared to the conventional FFT feature extraction by about greater than 85%, thereby proportionally reducing the power requirements as well as the memory area requirements.

The present method and system may provide other advantages as mentioned elsewhere herein.

Figure 3:
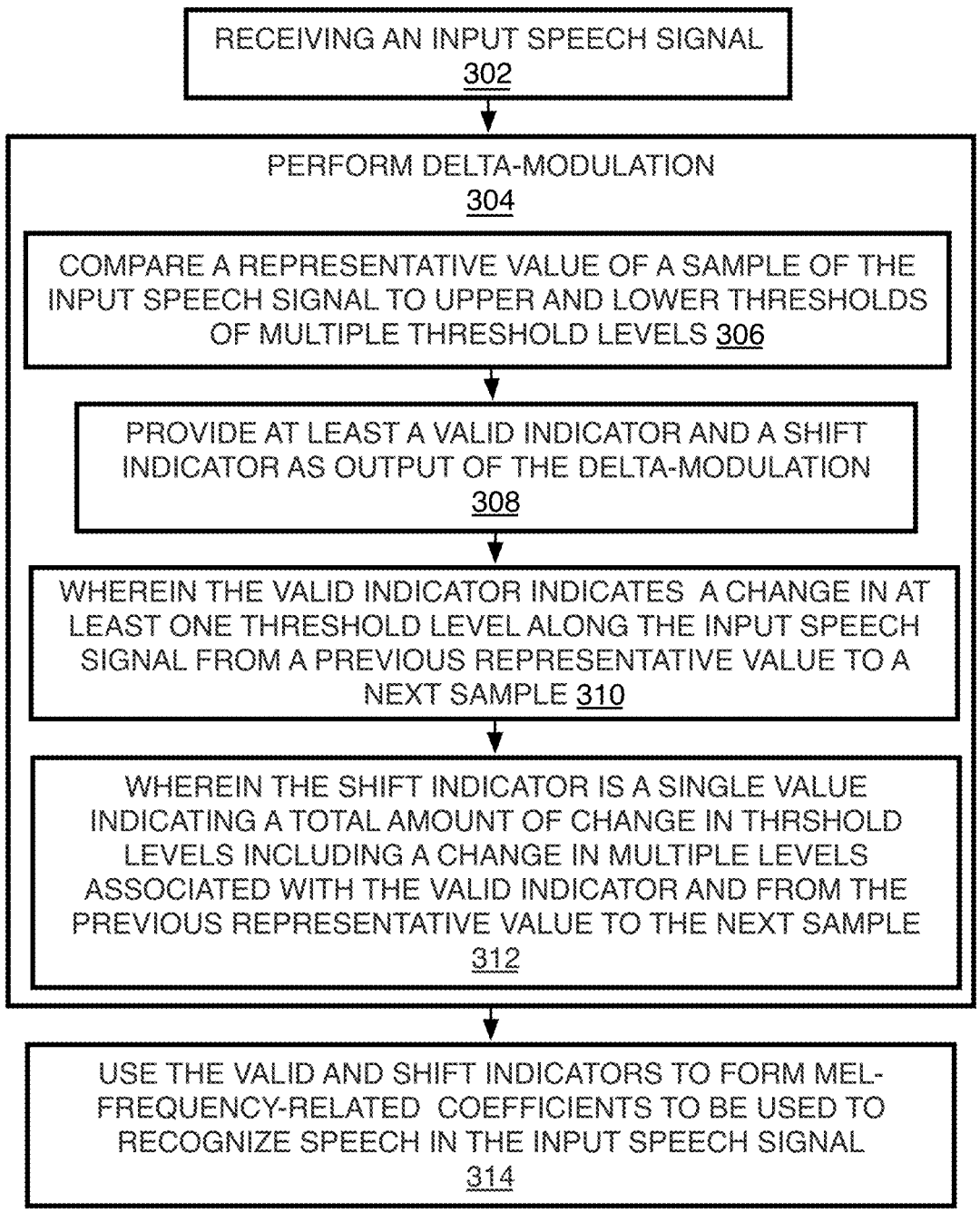
FIG. 3 is a flow chart of an automatic speech recognition process with temporal-domain feature extraction according to at least one of the implementations described herein.

Referring to FIG. 3, an example process 300 for a computer-implemented method of temporal-domain feature extraction for automatic speech recognition is provided. In the illustrated implementation, process 300 may include one or more operations, functions or actions as illustrated by one or more of operations 302 to 314 numbered evenly. By way of non-limiting example, process 300 may be described herein with reference to example automatic speech recognition devices or components described herein with any of FIGS. 1, 4-5, 7-9, 11-12, 14, and 18-20, and where relevant.

Process 300 may include "receive an input speech signal" 302. In other words, this operation involves receiving an input speech signal from one or more microphones which may be a stand alone microphone or may be a microphone that is part of many different multi-purpose devices, such as a smartphone. The input speech signal may have been pre-processed sufficiently for feature extraction.

Process 300 also may include "perform delta-modulation" 304. This may include "compare a representative value of a sample of the input speech signal to upper and lower thresholds of multiple threshold levels" 306. Particularly, the input speech signal is compared to the threshold level in discrete time (DT) domain. Thus, a sample of the signal is split once for each threshold level that is being analyzed for comparisons of the signal, or more accurately a representation value, to threshold levels. The comparisons of the same sample to multiple threshold levels may occur during the rising edge of a clock pulse (or it could be stated the comparisons occur in parallel or are synchronized), and by one form, set at a sampling rate of 16 kHz. Such synchronous comparisons to multiple threshold levels avoids other difficulties presented by omitting the clock such as complex CT circuits.

By one form, this delta-modulation operation also operates on a continuous signal that is not divided and stored as separate frames yet. Sampling of the signal may occur at 10 ms intervals, but these are not established frames yet because no accumulation of signal values is summed and stored for individual time intervals. The frames are not defined and stored until the accumulator operations after mel-frequency filtering as explained below. This also eliminates the windowing of the conventional FFT feature extraction.

Also as explained in detail below, the delta-modulation uses a number of threshold levels selected to cover the expected total range, or some part of the total range, of human speech frequencies, and by one form, each level is defined by thresholds that are a factor of the least significant bit voltage $V_{LSB}$ when the comparisons to level thresholds are in analog, or a digital pulse code modulation (PCM) code representation of the least significant bit voltage when the comparisons are performed in digital. This includes comparing the input speech signal to thresholds of multiple levels including at least two that both have upper and lower thresholds. By other forms, there may be a sufficient number of levels that are not adjacent levels that each have their own upper and lower thresholds and that are not shared by at least one of the other levels (or in other words, at least three consecutive levels that all have upper and lower thresholds). By yet another form, there may be many more levels. By one form, the analog threshold values are set as $2^k \times V_{LSB}$ for k levels (or in the digital domain, just $2^k$ digital threshold values), and for both positive and negative ranges of the levels. The details are explained below.

By one approach, the input speech signal is not directly compared to the level threshold values. Instead, the input speech signal is differenced from an accumulation value (acc or acc[n] where n is a time or sample), and acc is an accumulated sum of sample parameter terms with one sample parameter term for each sample of the signal analyzed so far. The sample parameter term is formed by factoring one or more of the indicators generated by the delta-modulation. For example, each or individual sample parameter terms factors a valid indicator that indicates when a change or event occurred along the input speech signal. Such change refers to a change in at least one threshold level among the multi-levels of the delta-modulator. The sample parameter term also factors a direction indicator (also referred to as an UP/DN indicator) that indicates whether the signal value (voltage or digital code value) went up or down compared to a previous sample (or representative value), and a shift indicator that represents the magnitude of the change and indicates the number of levels that have changed in the input speech signal from one sample to the next sample. This may include multiple levels. Both a positive and negative difference between the input speech signal and the accumulation values are determined for each threshold level being analyzed to represent the full positive and negative range of potential frequencies of a signal. The acc in the analog system is run through a digital-to-analog convertor (DAC) forming a dac(t) analog value to difference from the x(t) input speech signal so that the difference between input speech signal and the accumulation value (x(t)−dac(t), and dac(t)−x(t)) generally referred to as the representative value) is compared to the thresholds (or reference voltages) in analog form. The result of the comparisons for the analog input signal also acts as an analog-to-digital convertor (ADC) by providing a binary value that indicates whether the threshold or the representative value was larger as explained below. The acc is used directly for differencing in the digital delta-modulator to compare the differences (or representative values) to the thresholds.

Process 300 may include "provide at least a valid indicator and a shift indicator as output of the delta-modulation" 308. To this end, process 300 also may include "wherein the valid indicator indicates a change in at least one threshold level along the input speech signal from a previous representative value to a next sample" 310. This refers to determining the change between consecutive samples of the input speech signal, and may be performed by control logic of the delta-modulator. This may involve generating valid indicator of a 1 when change occurs and a 0 when no change occurs.

Process 300 also may include "wherein the shift indicator is a single value indicating a total amount of change in threshold levels including a change in multiple levels associated with the valid indicator and from the previous representative value to the next sample" 312. Here, single value refers to a single term or word, and not necessarily a single digit. This is in contrast to the Schell system that can only indicate a change in one LSB between adjacent samples. One example equation for computing the shift indicator (or shift value or shift indicator value) is provided below as equation (4). By one form, computing the shift indicator value includes dividing the difference (or representative value) by the $V_{LSB}$.

Process 300 also may include "using the valid and shift indicators to form mel-frequency related coefficients to be used to recognize speech in the input speech signal" 314. This refers to receipt of the indicators for use in event-driven mel-frequency finite impulse response (FIR) filters. Particularly, a number of mel-frequency FIR filters are used where each filter has a triangular function that covers a certain range of mel-scale frequencies and that is different from the frequency range of the other mel-frequency FIR filters, although the ranges may overlap. One typical technique is to use 40 mel-frequency FIR filters, by another example only 13 mel-frequency filters are used, but many other examples exist. Each mel-frequency FIR filter may have an array of branches (or taps) where each branch applies a different mel-frequency coefficient. The indicators are propagated from branch to branch, and the valid indicator controls which branches will contribute a modified mel-frequency coefficient value to the adders of the filters. Specifically, each branch of a mel-frequency filter has logic to weight a different mel-frequency coefficient that is then summed with all of the other weighted coefficients to form a FIR output intermediate value for that filter and over a number of samples (up to the number of taps or branches). The individual branches may use the direction (UP/DN) indicator to determine whether a positive or negative mel-frequency coefficient should be applied, and then the shift indicator is used to binary-left shift the mel-frequency coefficient to have a greater weight with a greater shift indicator to indicate a proportionally higher signal value on that sample of the input speech signal. When the valid indicator at a branch indicates a change in signal value occurred with that sample, the modified or weighted mel-frequency coefficient is then provided for summation with the other weighted mel-frequency coefficients from the other branches of the same mel-frequency filter. Otherwise zero is passed on for the summing operation when no change is indicated by the valid indicator, thereby effectively forming an event-driven FIR filter since only those samples with an event contribute to the output of the filter. Also, this logic uses the left shift to avoid multiplication to determine the FIR output intermediate sums.

The sums of the modified mel-frequency coefficients are provided from each mel-frequency FIR filter. The sums are accumulated separately for each FIR filter and for a certain number of samples, or for a certain interval, to form a frame represented by the accumulation. A 10 ms frame may be formed at 16 khz which includes 160 samples per frame as one example. The basis for using the accumulation to represent a frame is Parseval theorem as explained above. Also mentioned above, while the use of Parseval's theorem enables the multi-level delta-modulation and event-driven FIR filtering in the temporal-domain, it will be understood that other configurations can be used with the Parseval-based accumulation such as a baseline approach where input signals are provided to non-event-driven mel-frequency FIR filters, or by yet another approach, a single-level delta-modulation and event driven FIR filter may be used with the Parseval accumulator. As yet another option, in order to reduce computational load and in turn power consumption of the computing device, the accumulation without taking the square may be used and is found to be adequate since the back-end ASR processes can compensate for inaccuracies during the feature extraction here. The log of the accumulation generates a mel-frequency spectrum coefficient (MFSC). When desired, a discrete cosine transform (DCT) can be applied to the MFSC to generate a mel-frequency cepstrum coefficient (MFCC).

Thereafter, the MFSCs or MFCCs are provided to an acoustic scoring unit at an ASR back-end to form acoustic scores provided to a decoder (or WFST), which provides hypothetical utterances to a language model to output a final word recognition that can be acted upon whether audibly emitting the recognized words, displaying the recognized words, or performing some other automatic action depending on which words were recognized, all as described above.

Figure 4:
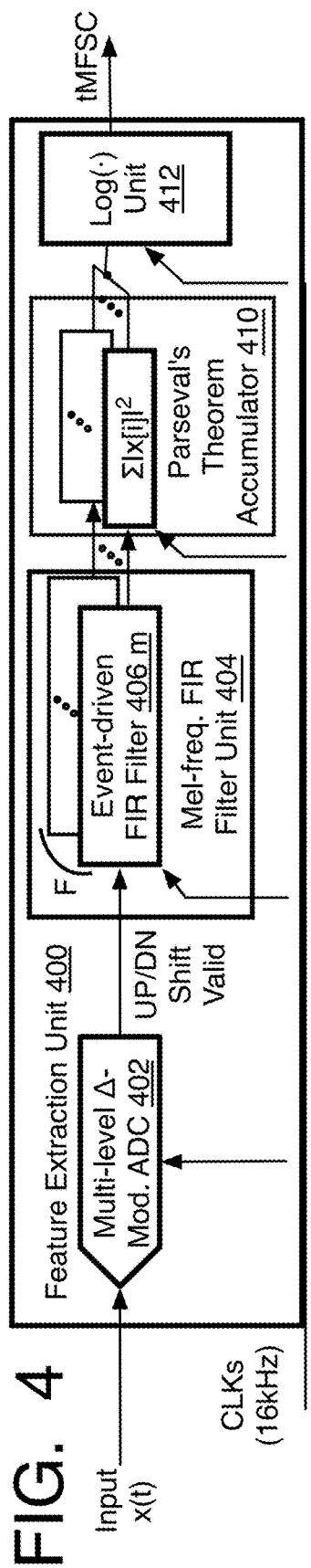
FIG. 4 is a schematic diagram of an automatic speech recognition system with a temporal-domain feature extraction front end according to at least one of the implementations described herein.

Referring to FIG. 4 to provide more detail, an example T-MFSC feature extraction unit 400 may have an end-to-end speech recognition pipeline. This may include a multi-level delta-modulation ADC 402 that receives input speech signal x(t) which is a continuous analog signal. The signal may be sampled at 16 kHz. The delta-modulator may perform the comparisons to multiple threshold levels as discussed herein to generate a direction (UP/DN) indicator, valid indicator, and shift indicator, and provide those indicators to a mel-frequency FIR filter unit 404 that has multiple event-driven FIR filters 406 from 1 to F filters with each filter provided for a different range of mel-scale frequencies as described below. By one example form, the feature extraction unit controls the operations by the use of a clock, and by one example, at 16 kHz.

The FIR filter unit 404 has FIR filters each with an array of branches (or taps) with one mel-frequency coefficient for each branch as described above, and where the UP/DN indicator, valid indicator, and shift indicator are propagated from branch to branch to modify (or shift or weight) the mel-frequency coefficient on the branch. The modified coefficient (or zero when no change is present) with other modified coefficients or zeros from other samples being analyzed within the branches on the same mel-frequency filter are forwarded for summation. These sums from each or individual FIR filters are then provided to an accumulator 410.

The accumulator 410 uses an energy operation for each filter, based on Parseval's Theorem to obtain energy of filter outputs in a time-domain without using FFT. By one form, the theorem includes calculating energy of filter outputs by accumulating a square of filter outputs ($\Sigma |x[i]|^2$), and this is performed for each filter. By other options instead, the accumulation is performed by the direct $\Sigma |x[i]|$ values without taking the square to avoid multiplication operations. This has proven sufficiently accurate for purposes of feature extraction. The accumulation is performed separately for each FIR filter and adds FIR filter outputs for a certain number of sums, and in turn a certain number of samples, based on a clock (16 kHz for example) and the length of a frame such as 10 or 25 ms. By one form, a 10 ms frame may be formed by the accumulation of FIR filter outputs of 160 samples. The accumulations, or frames, then may be provided to a Log Unit 412 to generate MFSCs, and then optionally applied to DCT to form MFCCs, either or both of which may be provided to an ASR back-end for further ASR processing, and as mentioned and described below.

Figure 5:
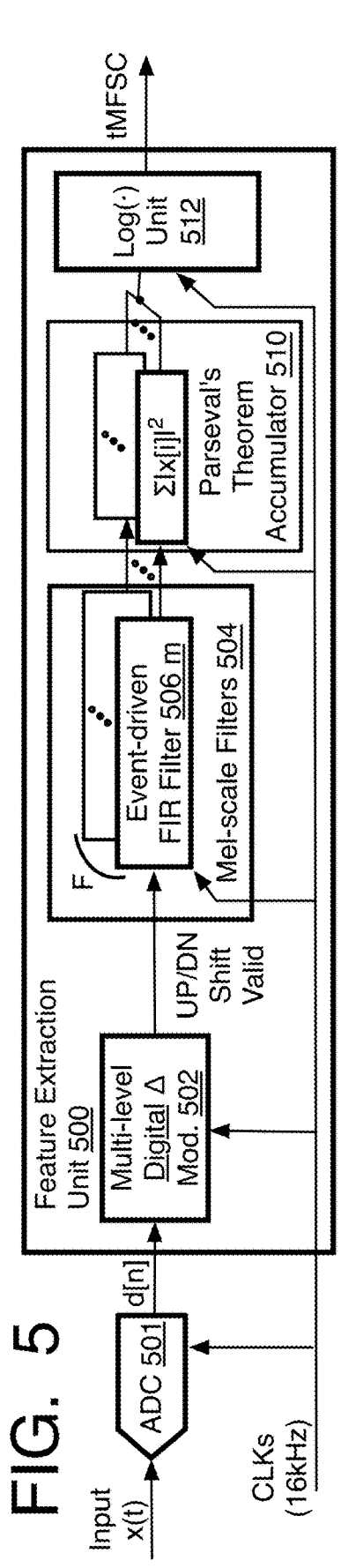
FIG. 5 is a schematic diagram of an automatic speech recognition system with a temporal-domain feature extraction front end according to at least one of the implementations described herein.

Referring to FIG. 5, an example T-MFSC feature extraction unit 500 is similar to feature extraction unit 400, except here the analog input speech signal x(t) is first provided to an ADC 501 that converts the input speech signal into a digital signal (or data) d[n]. The digital signal d[n] is then provided to a multi-level digital delta-modulator 502. The digital delta-modulator 502 has digital threshold or code levels for comparisons to digital representative values (the difference between digital value d[n] of the input signal and the acc[n] accumulation value described herein). The remainder of the feature extraction unit 500 has the same or similar components as the feature extraction unit 400.

Figure 9:
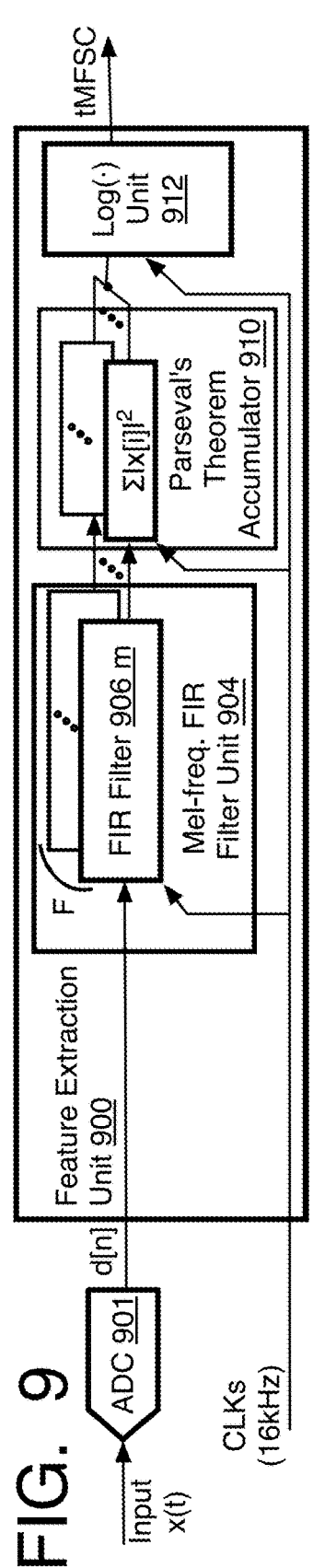
FIG. 9 of an automatic speech recognition system with a temporal-domain feature extraction front end according to at least one of the implementations described herein.

Referring to FIG. 9, an example baseline T-MFSC feature extraction unit 900 is another option but does not use the multi-level delta-modulation. Instead, an analog acoustic signal may be provided from an ADC 901, whether a part of a digital microphone, part of the feature extraction unit 901, or separate from both, and to provide a digital signal d[n] to one or more non-event driven FIR mel-frequency filters 906 of a mel-frequency FIR filter unit 904. The FIR filter unit 904 may operate simple FIR structures as are known that use a digital signal and using samples of the signal in a discrete time fashion. In this case, the Parseval accumulator 910, similar to those for feature extraction units 400 and 500, still is used to accumulate temporal-domain coefficient sums output from filters. The accumulator 910 can then convert these outputs into frames of frequency-domain-related intermediate coefficient values that can be used by a log unit 912 to form MFSCs as described herein. The advantage of the baseline T-MFSC feature extraction unit 900 is that it can reuse one or more neural network accelerators (processors) for computation thereby saving integrated circuit (IC) die area and manufacturing costs compared to a generic DSP for MFSC processing, which could result in reduced energy and power consumption. Specifically, fixed-function processors could be used for FFT-based MFSC operation or the described baseline T-MFSC feature extraction unit 900. However, any kind of fixed-function processors requires additional manufacturing costs compared to generic DSPs for MFSC computation so that a generic DSP is conventionally used for MFSC feature extraction. The generic DSP, however, also is configured for many general digital signal processing tasks resulting in greater power consumption to process a task compared to a fixed-function processor. Similarly, to avoid costs that would be spent on the baseline T-MFSC fixed-function processor design, instead the baseline T-MFSC can be executed by neural network processors (rather than by a generic DSP also performing general DSP tasks). The baseline T-MFSC is equivalent to 1-d convolution operation in neural network processors, and neural network processors are more energy efficient because they are configured for only limited operations of neural networks. Therefore, executing the baseline T-MFSC for feature extraction in a neural network accelerator can save integrated circuit (IC) die area and manufacturing effort and/or costs, which would be otherwise required by a generic DSP for MFSC processing, thereby reducing energy and power consumption.

By yet another option, a single-level delta-modulation, referred to as a T-MFSC baseline feature extraction with CT ADC, could be performed providing change and UP/DN indicators to an event driven mel-frequency filter unit, but that provides filter outputs to a Parseval accumulator as well. Many variations were contemplated.

Figure 6A:
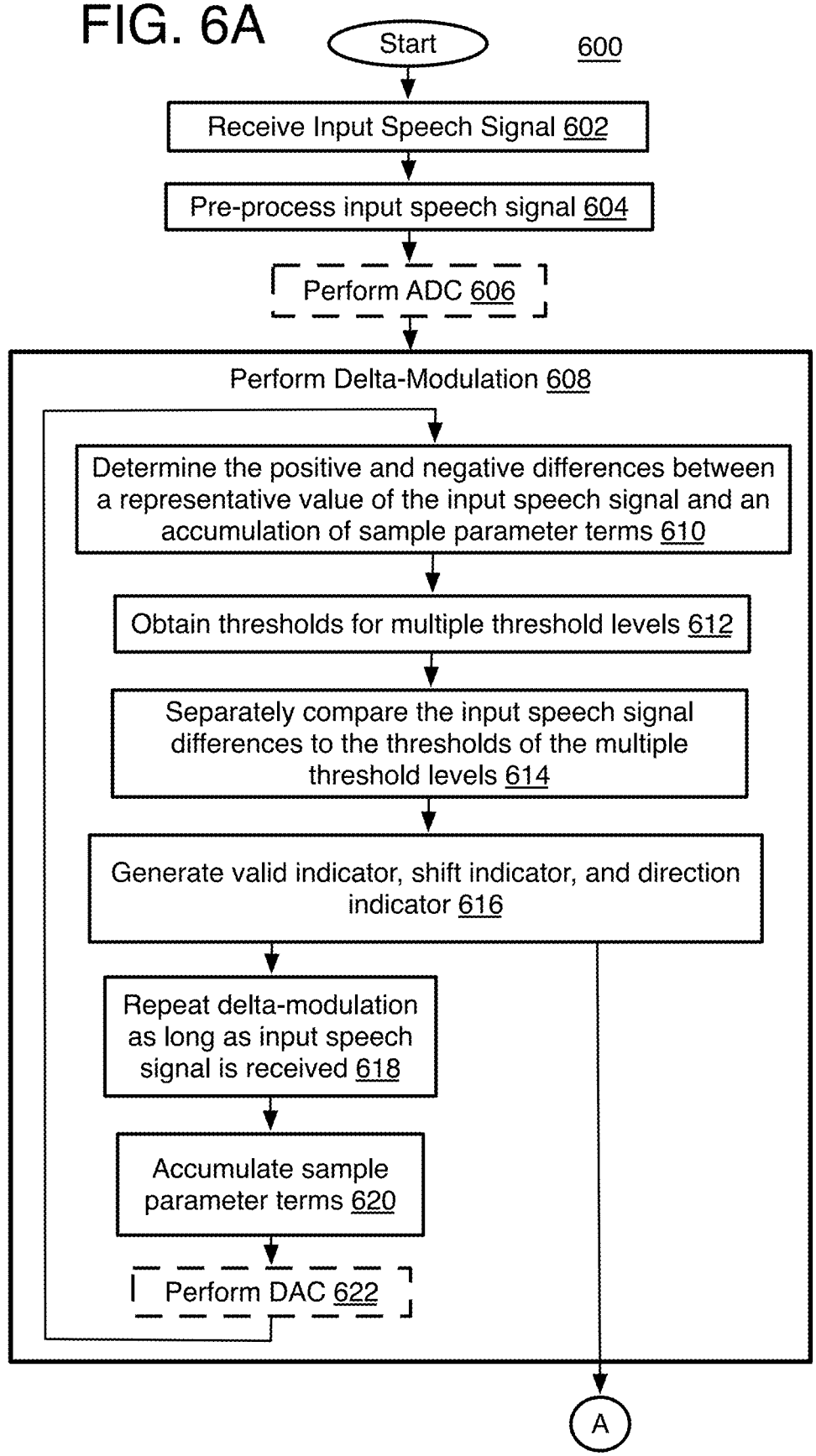

Referring now to FIGS. 6A-6B, an example computer-implemented process 600 of feature extraction for automatic speech recognition is provided. In the illustrated implementation, process 600 may include one or more operations, functions or actions as illustrated by one or more of operations 602 to 644 numbered evenly. By way of non-limiting example, process 600 may be described herein with reference to example speech recognition devices or components described herein with any of FIGS. 1, 4-5, 7-9, 11-12, 14, and 18-20, and where relevant.

Process 600 may include "receive input speech signal" 602, and at this point, this involves receiving an analog input speech signal as described above and that may be converted to a digital signal by a separate ADC (or ADC at a digital microphone) or may be converted by the delta-modulation unit itself as explained below. Also mentioned, this operation may include receiving a continuous signal that is not yet divided into frames but is sampled at intervals to form a discrete time domain and by using a clock at a sampling rate of 16 kHz by one example.

Process 600 then may include "pre-process input speech signal" 604, and whether considered a part of the feature extraction unit or a separate pre-processing unit upstream from the feature extraction unit on an ASR pipeline, the pre-processing may include any operation that places the signal in sufficient form for feature extraction. The pre-processing may include noise cancelling, pre-emphasis filtration to flatten the signal, voice activation detection (VAD) to identify the endpoints of utterances as well as linear prediction, additives such as energy measures, and other processing operations such as weight functions, feature vector stacking, transformations, dimensionality reduction, and normalization. The pre-processing may occur before or after ADC or both when a separate ADC is provided. Some of these operations could be performed at other places along the ASR pipeline as well.

Process 600 may optionally include "perform ADC" 606. For this option, ADC is performed by a separate ADC unit (including an ADC unit at a digital microphone) such as ADC 501 (FIG. 5) for example, to convert analog signal values of the samples into digital binary codes or values, or more specifically PCM codes. When the ADC is used, the digital signal in the form of PCM codes is then provided to a multi-level digital delta-modulation unit. Otherwise, the separate ADC is omitted, and a multi-level delta-modulation ADC unit performs the ADC itself.

Figure 7:
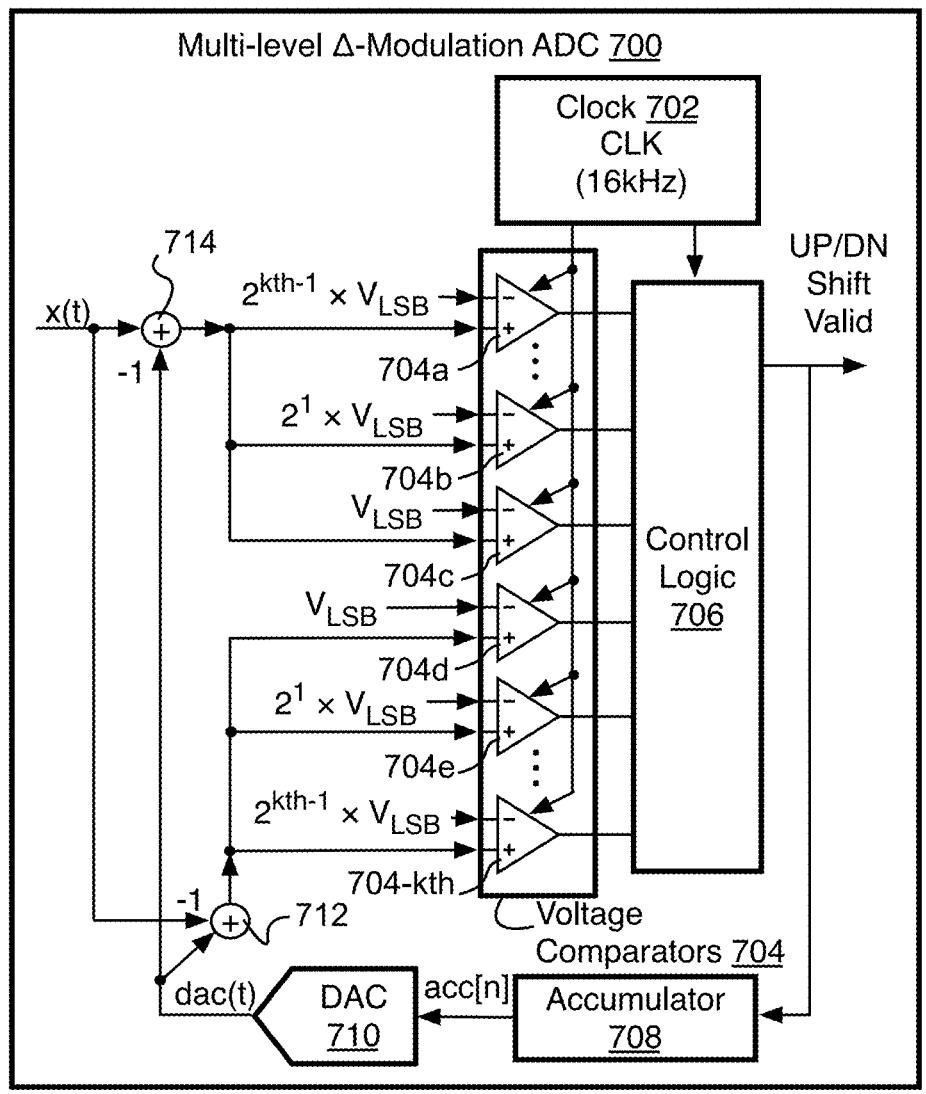
FIG. 7 is a schematic diagram of an example delta-modulator ADC according to at least one of the implementations described herein.

Referring to FIG. 7, process 600 may include "perform delta-modulation" 608. This operation may be performed by digital or non-digital delta-modulators. An example multi-level delta modulation ADC unit 700, similar to delta modulation unit 402 (FIG. 4), receives the input speech signal in analog form and performs the ADC itself by providing digital indicators that represent the changes and magnitudes of the voltages in the input speech signal. In other words, the delta-modulator (modulation unit) converts the analog signal into event-driven code for an event-driven FIR filter unit.

In more detail, the multi-level delta-modulation ADC unit 700 has a clock 702 that controls the timing of the operations at least at the delta-modulation unit 700 but could be the clock driver for other components of the feature extraction unit of which the delta-modulation unit 700 is a part such as with feature extraction unit 400. The delta-modulation ADC unit 700 also may have a set of voltage comparators 704 with comparators 704a to 704-kth, control logic 706, an accumulator 708 that accumulates parameter terms, a digital to analog convertor (DAC) 710, and adders 712 and 714.

In operation, the delta-modulation unit 700 receives samples x(t) of a continuous analog input speech signal, and the process 600 includes "determine the positive and negative differences between a representative value of the input speech signal and an accumulation of sample parameter terms" 610. Specifically, the input analog acoustic signal is split once, and one of the splits has its sign changed to provide both a positive and negative value. The samples are then differenced at adders 712 and 714 and from an analog accumulation value (dac(t)) converted from a digital accumulation value acc[n] of parameters terms with one parameter term per sample). Thus, adder 714 performs (x(t)+−dac (t)) while adder 712 performs (dac(t)+−x(t)) to provide both positive and negative differences, and the differences are each considered a representative value of the input speech signal for the comparisons and approximately represents the change in input signal from sample to sample.

The accumulation value acc[n] computed by the accumulator unit 708 factors a valid indicator, a direction indicator, and a shift indicator, where the accumulation value acc[n] is formed by:

$$\text{acc}[n] = \Sigma_{N=0 \ldots (n-1)} \{(\text{Valid}[N]) \times (\text{UP/DN}[N]) \times (2^{Shift[N]})\} \quad (1)$$

where valid, UP/DN, and shift are indicators generated by the control logic 706 of the delta-modulation unit 700. Valid is an indicator that indicates when a change in the signal value (voltage or digital code value) of the input speech signal has occurred from one sample to a next sample (or current sample n) and that has changed at least one threshold level (or reference voltage level or here one $V_{LSB}$). UP/DN is a direction indicator that indicates whether the signal value has risen or fallen from one previous sample (or previous representative value) to a next sample of the input speech signal. Shift is a shift indicator that indicates the magnitude of the change associated with the valid indicator and is a count of the number of threshold levels that the input speech signal has changed from the previous sample (or previous representative value) to the consecutive next sample. N is the number of samples 0 to n−1 of the signal analyzed so far. Other details for computing the indicators are provided below with the discussion of the output of the control logic 706.

Turning back to preparing for the comparisons, once the positive and negative representative values of the sample of the input speech signal are established, each representative value is split again but now split once for each threshold that is being tested by the comparators 704. For each of these splits, the input speech signal is compared to a threshold by one of the comparators 704a to 704-kth. Herein, the term "threshold level" refers to a range of values with an upper threshold and a lower threshold where the thresholds may be voltage levels when an analog input signal is received, and code levels when a digital input signal is received. The values of the portions or samples of the input acoustic signal used to form a representative value compared to the threshold levels may be referred to as having signal values whether actually an analog voltage level (or value) or a digital code value.

For the comparisons accordingly, process 600 may include "obtain thresholds for multiple threshold levels" 612. The thresholds here for modulator 700 are each a reference voltage that is a factor of the least sensitive bit voltage $V_{LSB}$ which may be set as usual based on the resolution of the ADC and full-scale range of the voltages (or code) for the signal (or other known methods). Thus, by one example, the thresholds range from $(1 \times V_{LSB})$ to $(2^{kth-1} \times V_{LSB})$, and this range is provided twice: one range for the positive input speech signal representative value, and another of the range for the negative input speech signal representative value. The thresholds may be set in this binary-weighted fashion to lower the number of threshold levels used, and in turn the number of events processed compared to the CT non-clock Schell feature extraction and the FFT frequency-domain feature extraction. By one form, the thresholds are set relative to a reference voltage $V_{ref}$ that is the zero point between the two ranges (or from a range of $-2^{kth-1} \times V_{LSB}$ to $+2^{kth-1} \times V_{LSB}$). The $V_{ref}$ can vary from sample to sample depending on the indicators described herein (see equation (2) below), and the first $V_{ref}$ is set at zero. Since the thresholds are set relative to the $V_{ref}$, the values of the thresholds also may vary from sample to sample.

Process 600 may include "separately compare the input speech signal differences to the thresholds of the multiple threshold levels" 614. This involves comparing the representative value (the difference) to each of the established thresholds. This may be performed in a synchronized manner according to the clock so that comparisons of the same input speech signal sample occur at the same instant in time along the clock pulses, or at the same point on the same pulse. This may be referred to as performing the comparisons in parallel or synchronized. Also as mentioned, the clock may be set at 16 kHz to control the synchronized comparison timing, but at a maximum that is at or less than the Nyquist sampling theorem rate, or in other words, twice the highest analog frequency component, which avoids oversampling. By one form, the sampling, and in turn the comparisons, are performed at 10 ms intervals.

Figure 7A:
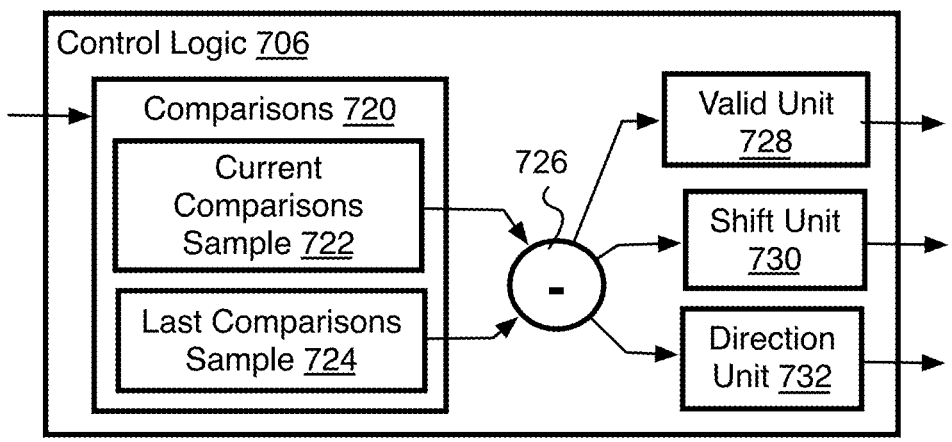
FIG. 7A is a schematic diagram of one example control logic for the delta-modulator of FIG. 7 or FIG. 8 and according to at least one of the implementations described herein.

Referring to FIG. 7A, process 600 then may include "generate valid indicator, shift indicator, and direction indicator" 616, and in one example form, generated by the example control logic 706. The control logic 706 may receive the comparison results 720 including a current comparison sample 722 and a last comparison sample 724. Each comparison sample may have a vector or word of 1s and 0s with one digit from each comparator, where a 1 indicates the representative value is higher than the threshold and a 0 when the representative value is less than the threshold (or vice-versa), thereby revealing a shift and change in levels from sample to sample. For example, a previous sample may have results 00010 and a next sample has results 01000 showing the shift of two levels downward along the input signal. The comparisons of adjacent sample may be provided to a difference unit 726 that provides a count that indicates the difference between the two consecutive samples, which is then provided to a valid unit 728, shift unit 730, and a direction unit 732 that each determine their respective indicator.

By one form, the valid unit 728 determines the valid indicator as a count of the shift in digits in the comparison results. By another form, the valid indicator is computed relative to the reference voltage $V_{ref}$ described above. By one form, the reference voltage varies from sample to sample (as shown on FIG. 10), thereby varying the values of the thresholds, and is computed as:

$$V_{ref}[n]=V_{ref}[n-1]+(\text{Valid}[n-1]\times \text{UP/DN}[n-1]\times 2^{Shift[n-1]}\times V_{LSB}) \quad (2)$$

and where $V_{ref}$ starts at zero ($V_{ref}[0]=0$) as mentioned above, and where $V_{LSB}$ remains constant. A valid[n] indicator thereafter is then computed as:

$$\begin{cases} \text{If } V_{ref} - V_{LSB} \leq x(t = nT_s) \leq V_{ref} + V_{LSB}, \\ \text{then valid } [n] = 1 \text{ (level change exists)} \\ \text{Else, valid } [n] = 0 \text{ (No level change)} \end{cases} \quad (3)$$

As to the shift indicator, control logic 706 computes the shift indicator, and by one example, as:

$$\text{Shift}[n] = \text{floor}\left(\log_2\left(\frac{|x(t) - dac(t)|}{V_{LSB}}\right)\right) \quad (4)$$

which determines an approximation rather than an exact value of the shift indicator since it rounds to a closest lower integer. When the input speech signal decreases, shift reduces proportionately (from +2 to +1 for example). Thus, by one form, the shift value indicates the threshold level of the current signal sample relative to a zero threshold level from +1 to $-1$ $V_{LSB}$.

The direction unit 732 sets the direction (or UP/DN) indicator as:

$$\text{UP/DN}=\text{sign}(x(t)-\text{dac}(t)) \quad (5)$$

so that UP/DN is +1 when the input speech signal is rising from sample to sample, and −1 when the input speech signal is falling from sample to sample. The control logic 706 then provides the three indicators as controlled by the clock 702, and provides the indicators to a mel-frequency finite impulse response (FIR) filter unit.

Figure 10:
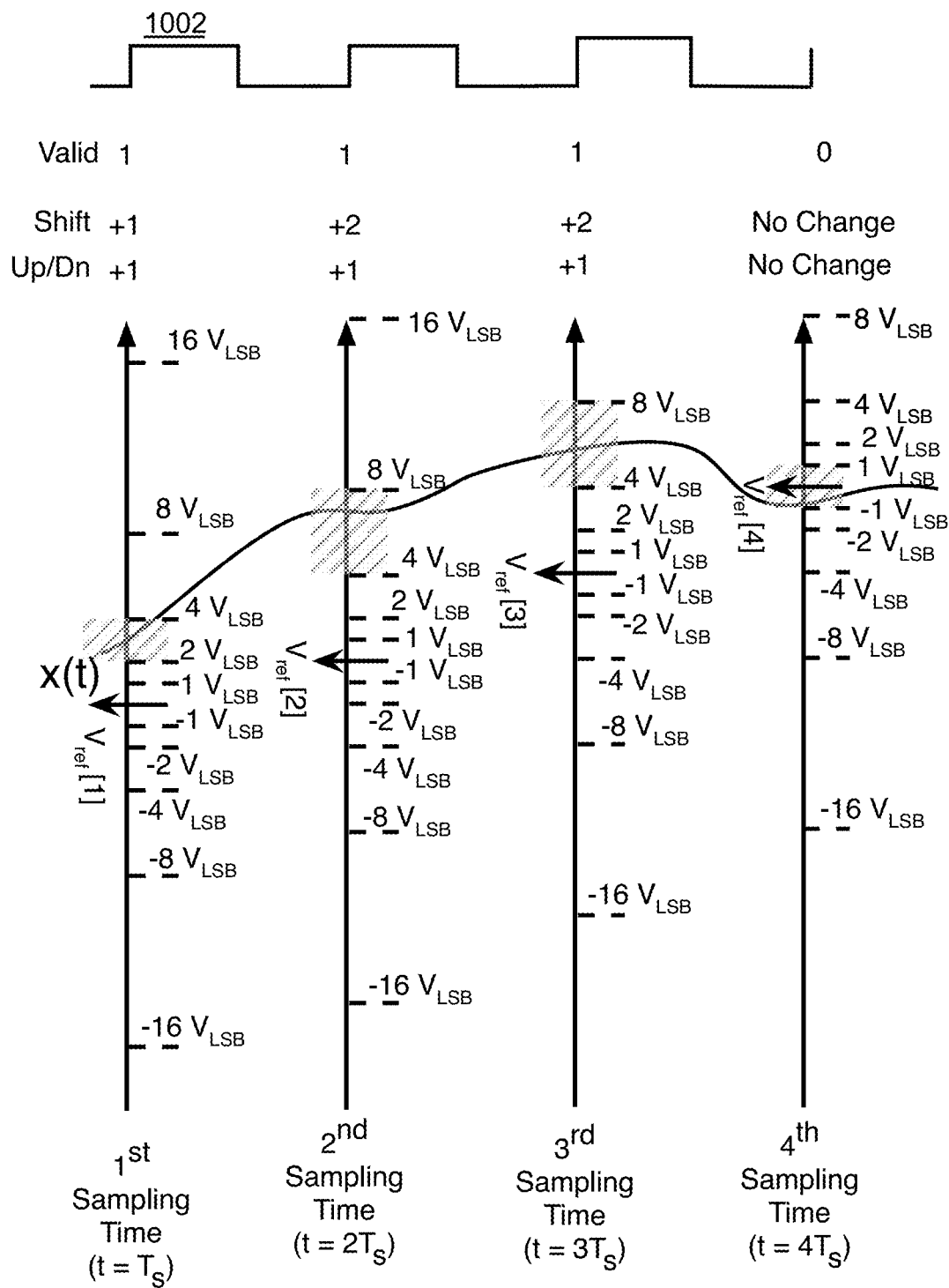
FIG. 10 is a schematic diagram showing pulse patterns aligned with time sample voltage level lines to explain operation of a delta-modulator according to at least one of the implementations described herein.

Referring to FIG. 10, a threshold level and pulse pattern diagram 1000 is provided to demonstrate the indicators. A 16 kHz pulse pattern 1002 has a pulse edge aligned with one sample threshold (or voltage or code) level line that are sampled at times $t=T_s$ to $4T_s$. The resulting valid, shift, and UP/DN indicators also are shown for each level line, where each line $T_s$ to $4T_s$ shows the $V_{ref}[n]$ calculated by equation (2) for each sample voltage level line, and thresholds $+/-2^k\times V_{LSB}$ are set relative to the $V_{ref}[n]$ on each sample voltage level line. A continuous input speech signal x(t) is shown as well and is sampled with a resulting voltage (or digital) value indicated where the input speech signal x(t) crosses the sample voltage level lines. The graph is simplified by having x(t) represent the input speech signal for comparison to the thresholds, but it will be understood that the line x(t) is actually the line of differences or representative values according to equation (1) and the description of delta-modulation unit 700 above such that the x(t) signal line actually represents (x(t)−dac(t)), or (x(t)−acc[n]), as the representative value on the sample voltage lines $T_s$ to $4T_s$ and that is compared to the thresholds. Diagonal hash marks show which level the input speech signal (or representative value) falls within for each of the samples $T_s$ to $4T_s$.

For example, equation (2) above tests whether the representative value is greater than $-1$ $V_{LSB}$ to 1 $V_{LSB}$ from the $V_{ref}$. Graph 1000 shows at $t=T_s$, representative value x(t)−$V_{ref}$ is greater than 1 $V_{LSB}$ so that assuming at $t=0$, x(t) was between 1 and 2 $V_{LSB}$, an event or change occurs now at $t=T_s$ such that the valid indicator is 1, and x(t) is now larger than $2\times V_{LSB}$ and less than $4\times V_{LSB}$ so that equation (3) results in the shift being calculated as 1 as well. Shift can also be determined by counting the levels from the initial bottom or peak level. Likewise, for sample $2T_s$ where a change is indicated, and the shift is calculated to be +2.

As mentioned, the position of $V_{ref}[n]$ may vary on each sample [n]$T_s$ according to equation (2). Thus for sample $3T_s$, a change still is present, but the shift has not varied since the x(t) representative value remains within the same number of levels relative to $V_{ref}[3]$. At sample $4T_s$, no change or event occurs because x(t)−dac(t) is less than 1 $V_{LSB}$.

Process 600 may include "repeat delta-modulation as long as input speech signal is received" 618. This may include having process 600 "accumulate sample parameter terms" 620, where the valid, shift, and direction indicators are provided to the accumulator unit 708 to factor the accumulation value acc[n] and to have the accumulation acc[n] subtracted from the input speech signal representative value for comparison of the difference of the next sample to thresholds as already described above. This also may have the process 600 include "perform DAC" 622 to form the dac(t) by converting the acc[n] to subtract and add from the input speech signal samples x(t) for the next comparison when the delta-modulator is also acting as the ADC and the comparisons are performed in the analog-domain as described above as well. The process then loops back to operation 610 to prepare the next input speech signal sample to perform the comparisons.

Figure 8:
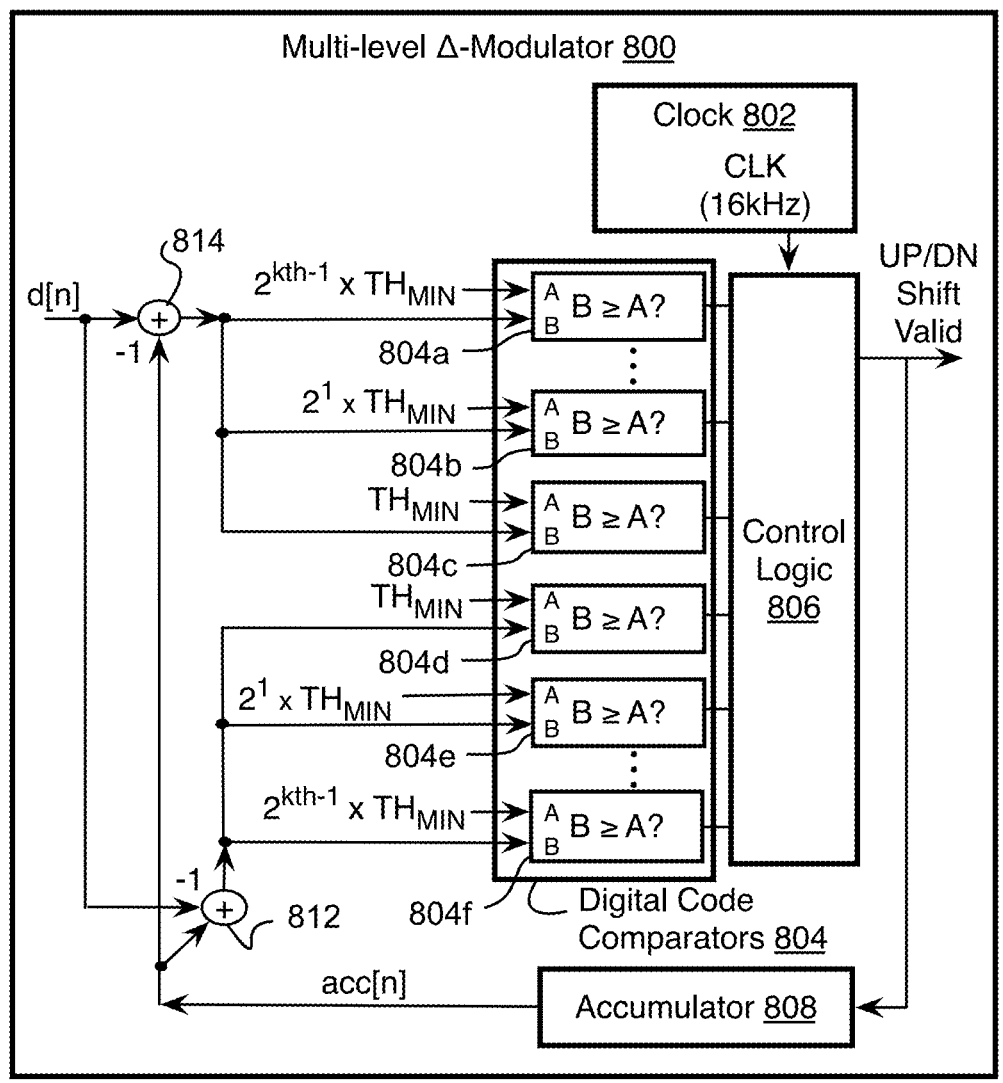
FIG. 8 is a schematic diagram of an example digital delta-modulator according to at least one of the implementations described herein.

Referring to FIG. 8, an alternative multi-level digital delta-modulation unit 800 may be provided such that process 600 includes the operation "perform ADC" 608 so that the delta-modulation unit receives a digital signal in the form of input PCM codes (d[n]) generated from a conventional or other ADC in a digital microphone for example, and the DAC operation 622 is omitted so that accumulations acc[n] are directly added or subtracted from the digital signal d[n] to form differences or representative values for comparison to thresholds. Also, the digital delta-modulation unit 800 has digital code comparators instead of the analog comparators 704 of delta-modulation unit 700 to perform the comparisons in the digital domain. Thus, the digital (or code) thresholds are simply $TH_{MIN}$ to $TH_{MIN} \times 2^{kth-1}$ for both the positive and negative comparisons, where $TH_{MIN}$ is the minimum threshold level in digital code corresponding to $V_{LSB}$ from FIG. 7 and the thresholds are shown as 'A' inputs to the comparator and the input speech signal representative value is the 'B' input to the comparator, and each comparator provides a 0 when B≥A, and otherwise a 1 (although other configurations could be used as well). Otherwise, the operation and structure of the multi-level digital delta-modulation unit 800 is similar to that of the operation and structure of the delta-modulation unit 700 such that those components with like reference numerals need not be described again. The result is the same with direction (UP/DN), shift, and valid indicators being provided to the mel-frequency FIR filter unit.

Figure 11:
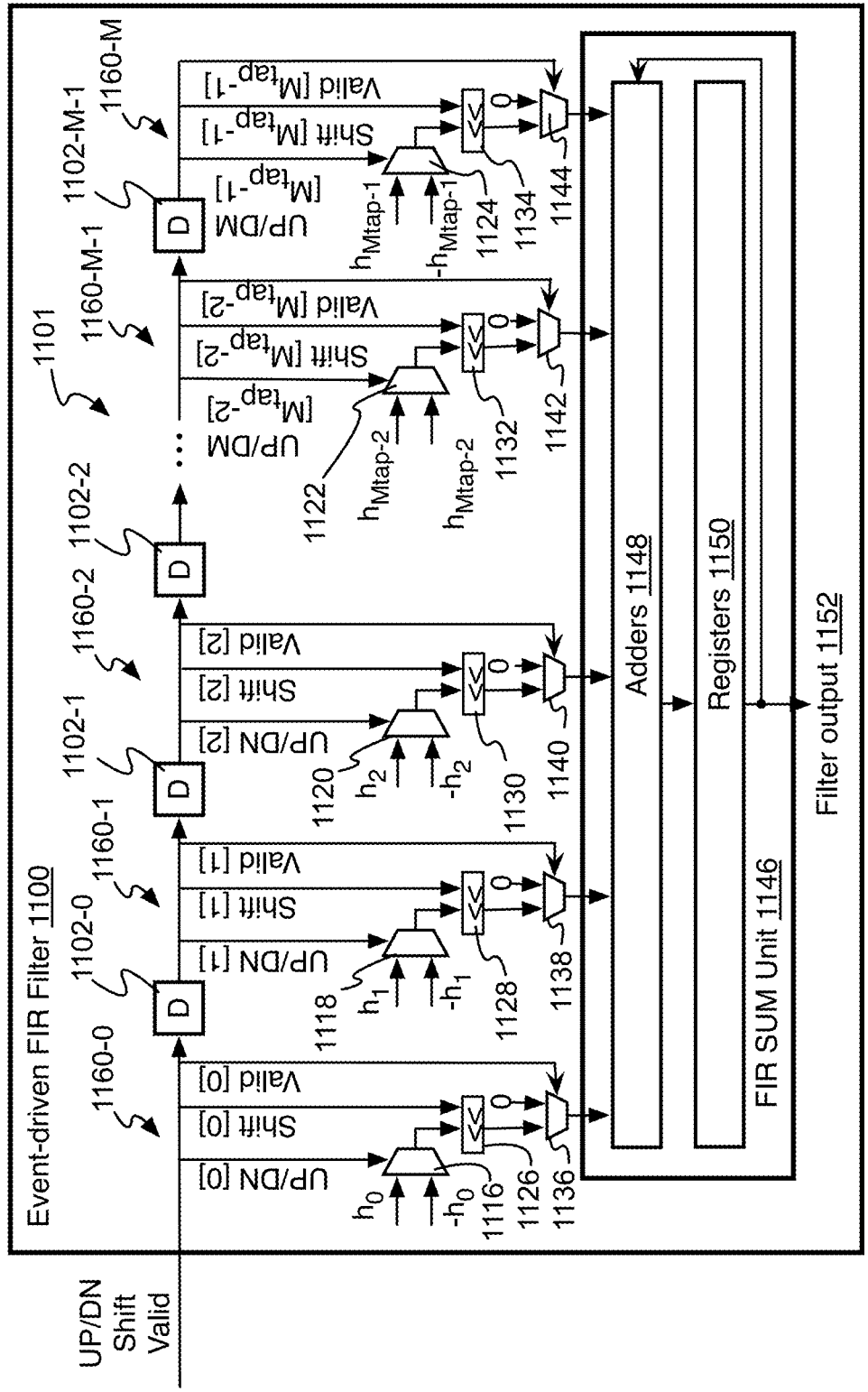
FIG. 11 is a schematic diagram of an example event-driven mel-frequency finite impulse response (FIR) filter according to at least one of the implementations described herein.

Referring now to FIG. 11, process 600 may include "perform Mel-frequency FIR filtering" 624. Thus, an event-driven mel-frequency FIR filter unit 1100 may be used by either the delta-modulation ADC unit 700 or the digital delta-modulation unit 800 for the T-MFSC pipeline or feature extraction unit 400 or 500. The FIR filter unit 1100 shows the logic and flow for one filter 1101 of multiple filters managed by the filter unit 1100. By one form, there may be up to a total of F mel-frequency filters where a single filter may be f=1 to F. By one example, F=40 mel-frequency filters but could be other number of filters such as 10, 13, or 25 for example. Each filter provides coefficients of a mel-scale triangular function with a different frequency range of the mel-scale that overlaps (but is not the same) as the frequency range of other filters.

Each filter 1101 has a number of mel-frequency coefficients $h_m$ of m=0 to Mtap−1 for a total of M taps (or branches), and the filter 1101 provides a tap, and in turn a branch of the circuit (or logic), for each coefficient $h_m$ (in both positive and negative form) to modify or weight the mel-frequency coefficient by using the indicators. Each filter 1101 also may have the same number of taps, and in turn, the same number M of coefficients $h_m$. For this example, each filter 1101 has a set of the branches 1160-0 to 1160-M. The filter logic also includes delay elements 1102-m (including 1102-0 to 1102-M−1) that controls the flow of indicators from branch to branch based on an event (or change). These delay elements may be referred to as delay-taps. The details of the filter logic are as follows.

Figure 12:
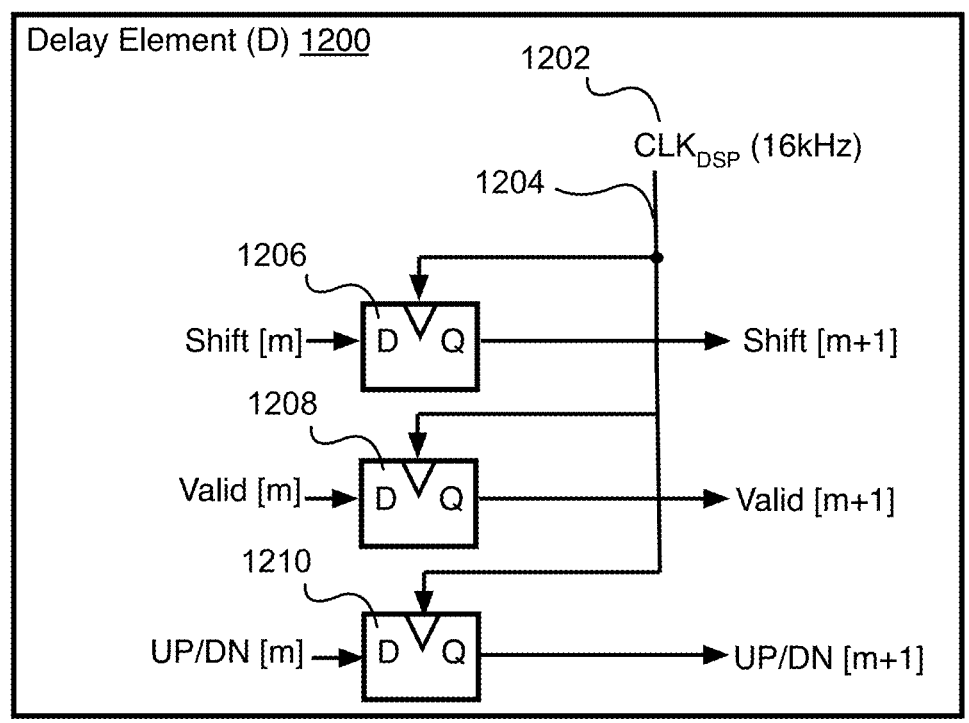
FIG. 12 is a schematic diagram of an example delay element used on the FIR filter of FIG. 11 according to at least one of the implementations described herein.

Referring to FIG. 12, each filter 1101 receives the three indicators: valid, UP/DN, and shift from the delta-modulation unit 700 or 800 and at 16 kHz as managed by a digital signal processor (DSP). The process 600 then includes "propagate shift, valid, and direction indicators through FIR filter branches" 626. Here, this operation includes the use of example delay element 1200, which may be the same or similar to one of the delay elements 1102-m.

While a first tap or first branch 1102-0 may be operated without a delay gate to modify or weight a first mel-frequency coefficient ho, thereafter the indicators are then propagated through a sequence of delay elements to the other branches for weighting their mel-frequency coefficients, and the weighted mel-frequency coefficients of each branch with a weighted mel-frequency coefficient are then summed after each propagation of indicators occurs. Before explaining how mel-frequency coefficients are weighted at each branch and summed, the delay element that controls the propagation is explained. Specifically, a delay element 1200 receives valid[m], shift[m], and UP/DN[m] indicators located at a certain branch of the FIR filter and for propagation to a branch m+1 of the FIR filter that applies a coefficient $h_{m+1}$, and received from the delta-modulation unit or from a previous branch. The delay elements each have a CLK 1202 which may be of a digital signal processor (but could be provided by other logic) and here set at 16 kHz for this example. The clock signal is provided to a DFF 1206 to provide a shift[m+1] indicator value, a DFF 1208 to provide a valid[m+1] indicator, and a DFF 1210 to provide an UP/DN[m+1] indicator value, all three of which are provided to the next delay element upon receiving the clock signal so that propagation occurs with each sample received at the FIR filter and as synchronized to the clock.

Returning again to mel-frequency FIR filter 1100 (FIG. 11) to explain the logic at each of the branches 1160-0 to 1160-M, process 600 may include "apply mel-frequency coefficients at each mel-frequency filter with one coefficient at each branch in a filter" 628, and performed for each mel-frequency (FIR) filter. At the first branch 1160-0, and at the other branches 1160-1 to 1160-M disposed after each delay-element, logic is provided to weight the mel-frequency coefficient $h_m$ or to provide a zero when no change is present. First for the first branch 1160-0, the UP/DN[m] indicator is provided to a multiplexer (MUX) 1116 to act as a control to select a positive or negative version of the mel-frequency coefficient $h_m$. The mel-frequency coefficients $h_m$ are calculated by known methods. For example, Mel-Frequency Cepstrum Coefficients (MFCC) and Mel-Frequency Spectrum Coefficients (MFSC) have been used as acoustic features for inputs to speech recognition in a number of different techniques. See respectively, Davis, S. B., et al., "Comparison of Parametric Representations for Monosyllabic Word Recognition in Continuously Spoken Sentences," IEEE Transactions on Acoustics, Speech, and Signal Processing, vol. ASSP-28, no. 4, pp. 357-365 (1980), and He, Q., et al., "An Adaptive Multi-Band System for Low Power Voice Command Recognition," Interspeech, pp. 1888-1892 (2016); He, Q., "An Architecture for Low-Power Voice-Command Recognition Systems," PhD Thesis Dissertation (2016); Price, M, et al., "A 6 mW, 5000-Word Real-Time Speech Recognizer Using WFST Models," IEEE J. Solid-State Circuits, vol. 50, no. 1, pp. 102-112 (2015); Price, M, et al., "A Scalable Speech Recognizer with Deep-Neural-Network Acoustic Models and Voice-Activated Power Gating," IEEE International Solid State Circuits Conf. (ISSCC) Dig. Tech. Papers, pp. 244-245 (2017); and Amodei, D., et al., "Deep Speech 2: End-to-End Speech Recognition in English and Mandarin," Proceedings of Machine Learning Research, pp. 173-182 (2016).

The shift[m] indicator value is provided to a left shift unit 1126 that shifts the binary value of the mel-frequency coefficient $h_m$ left by the number of digits that is the value of the shift in order to weight the mel-frequency more the greater the shift value and the higher the of the input speech signal. This eliminates the need to perform multiplication for the weighting. Thus, by example, if the shift indicator is 2, the binary value of the mel-frequency coefficient is shifted left by two which effectively multiplies the mel-frequency coefficient by $2^s$ or here $2^2$. The valid indicator controls a mux 1136 that either forwards the weighted or modified (or shifted) mel-frequency coefficient when the valid indicator indicates a change is present (when the valid indicator is 1 for example), or forwards a 0 when the valid indicator is 0. Process 600 may include this operation with "provide shifted coefficient" 630. This logic structure of a branch is the same or similar for each of the other branches in the filter. Other branch structures are contemplated such as having the valid indicator control whether the coefficient is shifted in the first place, thereby saving further computational load.

Process 600 then may include "sum shifted coefficients of multiple branches of a filter" 632. Here, a FIR sum unit 1146 has one or more adders 1148 that sum all of the shifted mel-frequency coefficients, and zeros, together for all of the branches, and when the indicators of each acoustic signal sample is added to the FIR filter. In this example, the summation is performed according to the clock so that modified coefficients output from the branches at the same time are summed together to form a single sum that represents a number of input speech signal samples that is the same as the number of branches or coefficients m. At the start of an input speech signal, the branches without data may not provide a sum or may provide a zero for the summation.

Thereafter, the sums may be placed in registers 1150 to be collected and provided as filter outputs to the accumulation unit, such as accumulator 410 or 510 of feature extraction units 400 or 500 respectively.

Next, process 600 may include "perform energy operation of FIR filter outputs" 634, and by one option, process 600 may include "accumulate squared outputs for individual filters and over a certain number of samples or time interval" 636. By other options, this operation may include "accumulate magnitude of the filter outputs without squaring filter output" 638. Thus, as mentioned above, the basis for using the accumulation to represent a frame is Parseval theorem, where the squared sum of temporal domain energy ($\Sigma |x[i]|^2$) equals the squared sum of frequency-domain energy. The accumulation itself sums the filter outputs for a certain number of samples, or certain total time interval, to determine a total energy or intermediate coefficient for each mel-frequency filter, and to thereby form a frame of data. As mentioned above, one example accumulates 160 samples per frame at 16 kHz. The result is a vector of intermediate mel-frequency coefficients corresponding to one element for each filter, and where a vector is provided for each frame.

Also as mentioned above with FIG. 9, the Parseval accumulator may be used with other options, and is not necessarily limited to use with the multi-level delta-modulation and an event driven filter. Thus, the baseline T-MFSC feature extraction may receive digital input signal samples provided to a non-event-driven FIR, and the filter outputs (or filter output energies or energy values) are provided to a Parseval Theorem accumulator, such as accumulator 910, to provide frequency-domain-related intermediate coefficients to form the MFSCs and/or MFCCs as described above. Also as mentioned, another option is to provide a baseline T-MFSC CT ADC feature extraction that has delta-modulation, and by option in continuous time without using discrete samples, that only defines a single threshold level and that provides a change and UP/DN indicator to an event driven FIR filter. The filter outputs are then provided to the Parseval Theorem accumulator as described above.

For yet another option regarding the Parseval accumulator, this operation also may include "accumulate magnitude of the filter outputs without squaring filter outputs" 639 in order to eliminate multiplication for computation of the "square" in Parseval Theorem accumulator ($\Sigma |x[i]|^2$). Thus, by another form, this operation is performed without performing multiplication. It has been found the difference is not significant for purposes of feature extraction for ASR. Thus, the present method optionally may use the direct sum $\Sigma |x[i]|$, or summation of magnitude of filter outputs, whenever the Parseval accumulator is being used.

Referring to FIGS. 13A-13C, spectrograms 1300, 1302, and 1304 show the results from some of the different feature extraction techniques described herein. The voice input resulting in the spectrograms is the word "yes" recorded in 1-second length (from Google's speech commands dataset for example) and 40 mel-frequency filters having a FIR filter order (Ntap) of 100, and a FIR filter weight of 8b. 25 msec long frames and 15 msec frame strides were used. Spectrogram 1300 shows the results for the conventional MFSC feature extraction using FFT and frequency-domain mel-frequency filtering already. Spectrogram 1302 shows the results of the baseline T-MFSC baseline feature extraction (FIG. 9) that uses non-event driven FIR filtering (using multiplication) and the Parseval accumulator computing the square energy values $\Sigma |x[i]|^2$ of the filter output energy. Spectrogram 1304 shows the present T-MFSC event-driven feature extraction with multi-level delta-modulation ADC, event-driven mel-frequency FIR filtering, and also using the Parseval Theorem accumulator computing the square energy values. The delta-modulation here used a LSB of $2^4$ and thresholds $+/-(1, 2^1, 2^2, \ldots 2^{11})$. Visual inspection from the spectrograms shows that three features are correlated in all three spectrograms: energy intensity, filter index, and frame index, thereby showing that the Parseval accumulator sufficiently accurate relative to the FFT techniques. Also, simple fully-connected neural networks trained with T-MFSC with $\Sigma |x[i]|^2$ and $\Sigma |x[i]|$ demonstrated comparable accuracy to a neural network trained with MFSC, for keywords spotting with a "Resource Management" dataset. This shows that using $\Sigma |x[i]|$ instead of $\Sigma |x[i]|^2$ gives comparable accuracy at lower energy cost.

Process 600 then may include "perform log operation to generate MFSCs" 640, which converts the intermediate coefficients from the Parseval accumulator into MFSCs by known methods, and generalized as:

$$\text{Log}_{10}(A) = \text{MFSC} \qquad (6)$$

where A is each accumulation or intermediate mel-frequency coefficient in a vector of the coefficients for each frame. The result after applying the log operation to the accumulations of all of the filters is a set or vector of features or MFSCs that represent the mel-scale and are provided for each frame.

Process 600 also may optionally include "provide mel-frequency cepstrum coefficients (MFCCs)" 642, and this may include performing a discrete cosine transform (DCT) on the MFSCs to generate the MFCCs.

Process 600 then may "perform front-end ASR to recognize speech" 644. This may include providing the coefficients to an acoustic scoring unit, where the MFCCs or MFSCs or both are passed on to, or otherwise made accessible to, an acoustic scoring unit of an ASR system. Thereafter, a decoder may receive the acoustic scores to form phrase or word hypotheses, which are then provided from the decoder and to a language interpreter to provide a final word recognition, as explained for system 10 above for example.

Figure 14:
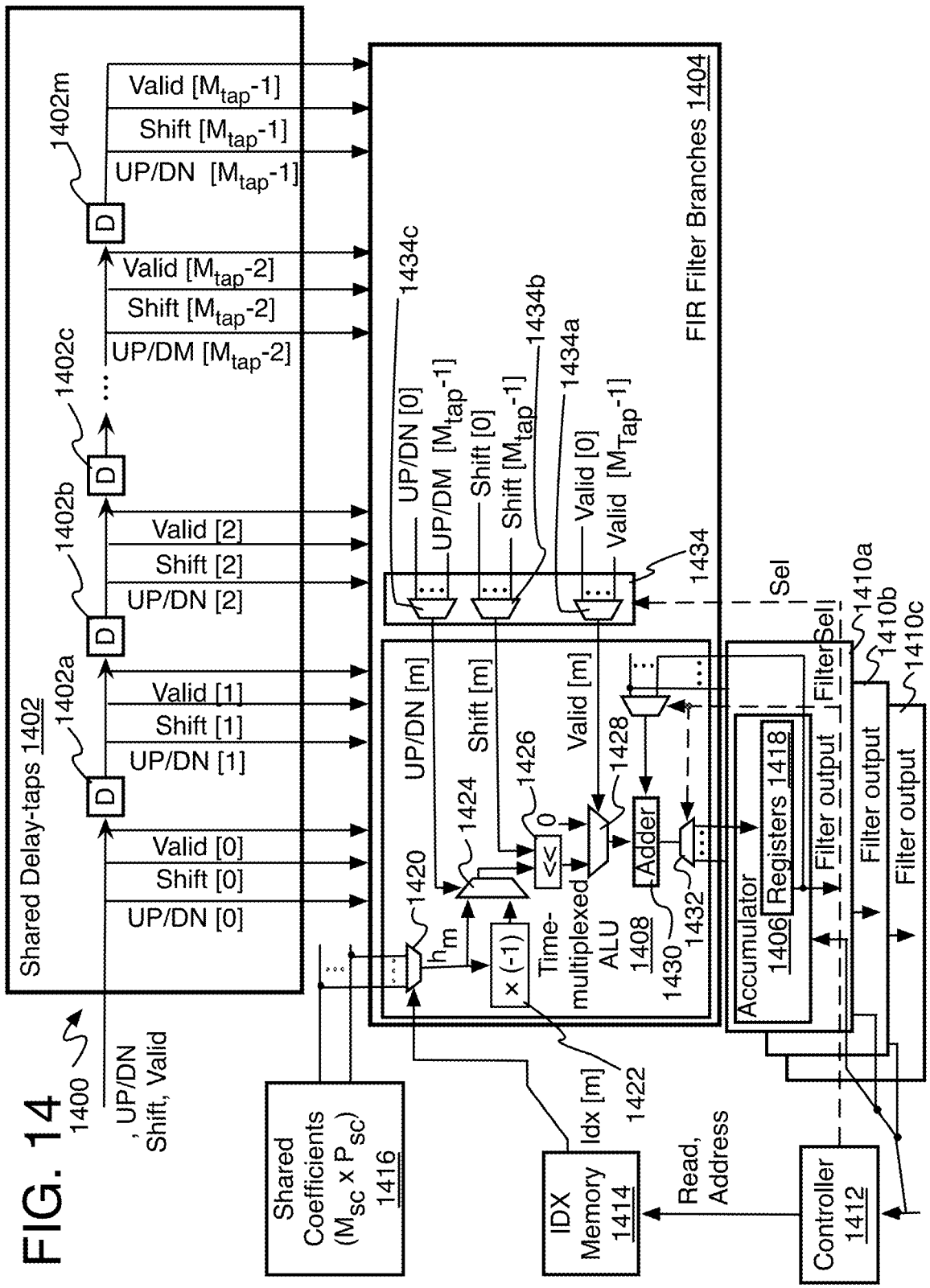
FIG. 14 is a schematic diagram of another example FIR filter system with shared delayed taps, shared coefficients, and/or timed-multiplexed arithmetic logic unit (ALU) according to at least one of the implementations herein.

Referring to FIG. 14 as another option, further power reduction and reduced memory requirements may be achieved by using shared delay-taps, a time-multiplexed ALU, and/or shared coefficients with index-based access. All three of these features are shown on feature extraction mel-frequency FIR filter 1400. The filter unit 1400 may have shared delay-taps 1402 including delay elements 1402a to 1402m. The delay elements are the same as those described above with filter unit 1100 (FIG. 11) and need not be described again here. In this case, however, the delay taps may be shared with all of the mel-frequency filters since the present T-MFSC technique may use many FIR filters in parallel, where the same delta-modulation event-driven indicators are provided to the delay-taps with the same structure whether in software or hardware or some combination such the DFFs are already described above with delay elements 1200 (FIG. 12). Thus, sharing the delay elements across all or individual ones of the FIR filters eliminates redundant delay-taps thereby reducing the computation load, memory requirements, and processor area.

By another option, the ALU for shift of coefficients and accumulation can be time-multiplexed to be shared among all or individual filters and all or individual branches (taps) of the filters to reduce leakage power and physical ALU area. Filter unit 1400 has an arithmetic logic unit (ALU) 1408 that operates the FIR filter branches 1404 here including a mux 1420 that provides the mel-frequency coefficients $h_m$, a sign change unit 1422 to provide negative coefficients, a mux 1424 controlled by the UP/DN[m] indicator, a left shift unit 1426 to shift the coefficient depending on the shift[m] indicator, a valid[m] mux 1428 to forward the weighted coefficient when an event occurs, or otherwise zero, all as explained with the similar components of filter unit 1100. The ALU 1408 also may have an adder 1430 and mux 1432 to provide sums of the branches and of different filters. A bank of multiplexers 1434 with multiplexers 1434a to 1434c are provided to control the indicator inputs from the delay elements to the ALU 1408. A controller 1412 controls the multiplexers to forward the correct indicator values form the correct filter selection (i=1 to F) and correct branch (0 to $M_{tap}-1$) of the filter for each indicator (valid, shift, and Up/DN).

The time-multiplexed ALU can reduce leakage power consumption and area of ALUs, by Current Area×1/$(\Sigma_{i=1}^{i=F_{filter}} M_{tap,i})$, where $M_{tap,i}$=the number of delay taps in i-th FIR filter and $F_{filter}$ equals the number of total FIR filters, at a cost of simple digital controller 1412 running at a faster frequency than $F_s \times \Sigma_{i=1}^{i=F_{filter}} M_{tap,i}$, where $F_s$=ADC sampling frequency, or 1/(unit delay). For example, for 40 mel-frequency FIR filters with 100 delay-taps for each filter, the time-multiplexed ALU can reduce leakage power and area of ALUs by Current Area×(1/4000), and a digital controller can run at a frequency of Fs×4000.

The feature extraction FIR filter unit 1400 also can permit sharing mel-frequency coefficients among FIR filters, which also reduces memory requirement, further reducing leakage power. For this feature, a shared coefficients unit 1416 provides the mel-frequency coefficients to the ALU 1408, and an index (IDX) memory 1414 indicates which coefficients to load to the branches and may be controlled by controller 1412 as well. The coefficient unit may operate with a CLK($F_{CLK} \geq M_{tap} \times F_s$), and the index precision may be provided at $(Idx_0 - Idx_{Mtap-1}) = \log_2 M_{sc}$. The ALU outputs the filter outputs to accumulators 1406 that have registers 1418 to hold the outputs, and this may be repeated for each filter with respective separate filter outputs 1410a to 1410c shown here as examples, but many more filters may be provided. The controller 1412 may communicate with each filter as shown to control which filter is being analyzed and which coefficients are to be provided to the ALU for processing of the filter branches.

Figure 15:
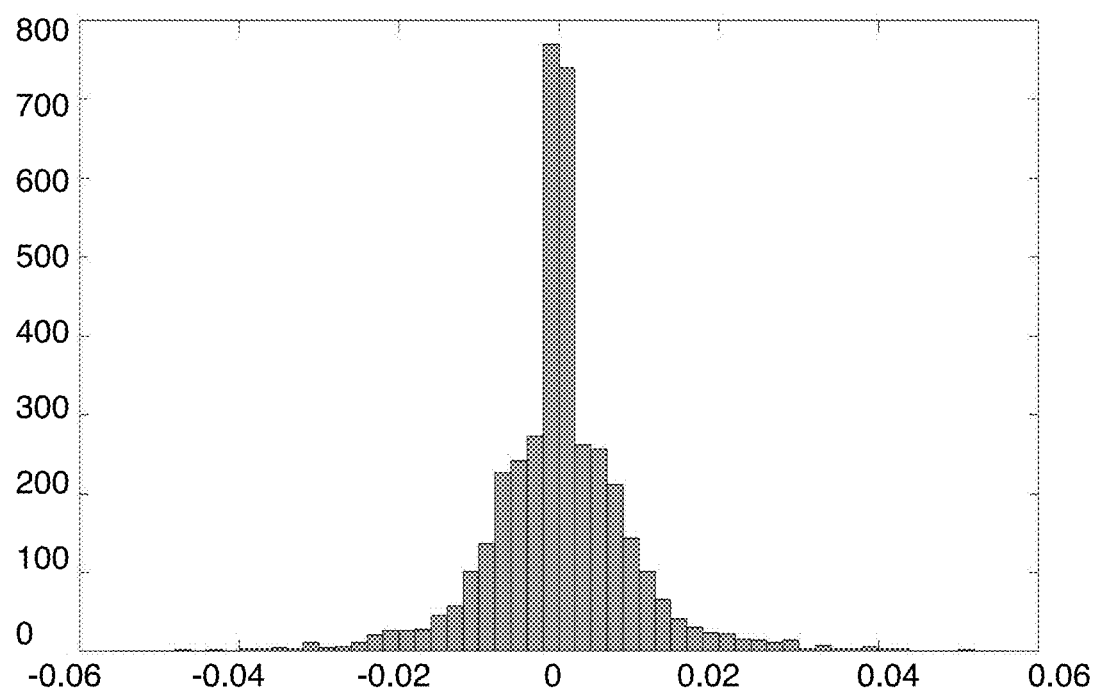
FIG. 15 is a graph showing a histogram of floating point coefficients and the count each coefficient is used according to at least one of the implementations herein.

Referring to FIG. 15, a graph 1500 shows a histogram of 4000 floating-point precision coefficients from 40 mel-frequency FIR filters with 100 delay-taps for each filter. The horizontal axis are the values of the coefficients, and the vertical axis is the count of how many times any particular coefficient value was used. As explained above, many of the coefficients from different filters may be the same because the mel-scale triangular functions of each mel-frequency FIR filter defines overlapping mel-scale ranges. The floating-point coefficients are concentrated around zero, and close to each other, so it is possible to compress them to only $M_{sc}$ shared coefficients with $P_{sc}$-bit fixed-point precision each, without a significant degradation in filter performance (sc refers to shared coefficients).

In contrast to non-sc FIR filters with a coefficient memory requirement of $P \times \Sigma_{i=1}^{i=F_{filter}} M_{tap,i}$, (P=precision of non-sc coefficients), shared-coefficient FIR filters merely use a coefficient memory of size $M_{sc} \times P_{sc} + \log_2 M_{sc} \times \Sigma_{i=1}^{i=F_{filter}} M_{tap,i} \approx \log_2 M_{sc} \times \Sigma_{i=1}^{i=F_{filter}} M_{tap,i}$, therefore reducing the memory use by approximately $\log_2 M_{sc}/P$. For example, for P=8-bit, $P_{sc}$=8-bit, and $M_{sc}$=16, memory reduction is approximately 50%.

Referring to FIGS. 16A-16J, graphs 1600 to 1618 numbered evenly show transfer functions in the frequency domain of filters with a number of different parameters. First, the results from ideal mel-frequency filters are shown (the highest peak and then flat outside of the peak 1620 on each graph). This is compared to the following: (1) FIR filters with unshared floating-point precision (originally blue and referred to on the key as "floating"), (2) FIR filters with 4b unshared fixed-point precision (originally black and referred to on the key as "fixed 4b"), and (3) FIR filters with 16 shared mel-frequency coefficients of 8b fixed-point precision (originally red and referred to on the key as "shared"). The frequency-domain graphs show frequency along the horizontal axis and amplitude along the vertical axis. The graphs also are for different filters numbered 31 to 40 of a total of 40 filters, each filter having a different number of mel-frequency coefficients ranging from 30 coefficients (referred to as $M_{taps}$ on the graphs) for filter 21, and up to 21 coefficients for filter 40. FIR filters with shared coefficients had $M_{sc}$=16 shared coefficients of the total 21 to 30 coefficients used at each filter as mentioned, and precision at $P_{sc}$=8b. While difficult to see on the graphs, the shared technique outperforms the counterpart FIR filters with unshared 4b fixed-point precision coefficients and shows similar performances as FIR filters with unshared floating-point precision coefficients. The lower the frequencies on the graph and outside of the peak, the better the performance. This is most easily seen on graph 1618.

While some features alone may improve the feature extraction described above, combining many of the above features permits a T-MFSC feature extraction to accomplish a more significant computation cost and memory requirement reduction, and can also lead to computation cost reduction of back-end processing because the lower number of events leads to a lower number of frames (or lower number of non-zero frames), and therefore to less computation.

The following tables summarizes the differences in computational load and memory requirements between the conventional MFSC technique and the present T-MFSC techniques disclosed herein. Table 1 summarizes the number of operations required by MFSC and T-MFSC, for sampling frequency=16 kHz, and 25 msec-long frame. Note for tables 1 and 2 below, $N_F$=F (number of filters referred to above).

TABLE 1

The number of arithmetic operations required by MFSC and T-MFSC.

COMPUTATION COUNT
MFSC ($N_{sample}$ = 400 for 25 msec-long frame at $F_s$ = 16 kHz)

| | |
|---|---|
| Load Audio | Initially load 560 B into buffer every 10 ms, load 160 B into buffer |
| Windowing (y = x * hamm) | $N_{sample}$ (MACs) |
| 512 points (pt) FFT | 512 × $\log_2(512)$ × 4 (MACs) |
| Mel-scale Frequency Filters ($N_F$) | 256 × $N_F$ (MACs) |

Baseline T-MFSC

| | |
|---|---|
| Mel-scale Frequency Filters ($N_F$) | $N_{sample} \times \Sigma_{k=1}^{k=Nf} N_{TAP,k}$ (MACs) |
| Accumulator (Parseval's Theorem) | $N_{sample} \times N_F$ (MACs) for energy or $N_{sample} \times N_F$ (Additions) for magnitude sum |

Event-driven T-MFSC

| | |
|---|---|
| Mel-scale Frequency Filters ($N_F$) | EventRate × $N_{sample} \times \Sigma_{k=1}^{k=Nf} N_{TAP,k}$ (Additions) |
| Accumulator (Parseval's Theorem) | EventRate × $N_{sample} \times N_F$ (MACs) for energy or EventRate × $N_{sample} \times N_F$ (Additions) for magnitude sum |

Table 2 summarizes memory requirements for 40 mel-frequency filters, 8b fixed-point precision data (P=8b, $P_{sc}$=8b), $M_{sc}$=16, and $M_{FRAME,OV}$=31 and $M_{FRAME,NON-OV}$=13, where ov stands for overlapping. For the particular case here, T-MFSC reduces memory requirements by 87% (with unshared FIR filter coefficients), and 92% (with shared coefficients) for the number of delay taps ($M_{tap}$) in each FIR filter=50. For Tables 1 and 2, a 325 msec window for context and 8-bit precision was assumed. The units are shown in Bytes.

Figure 17:
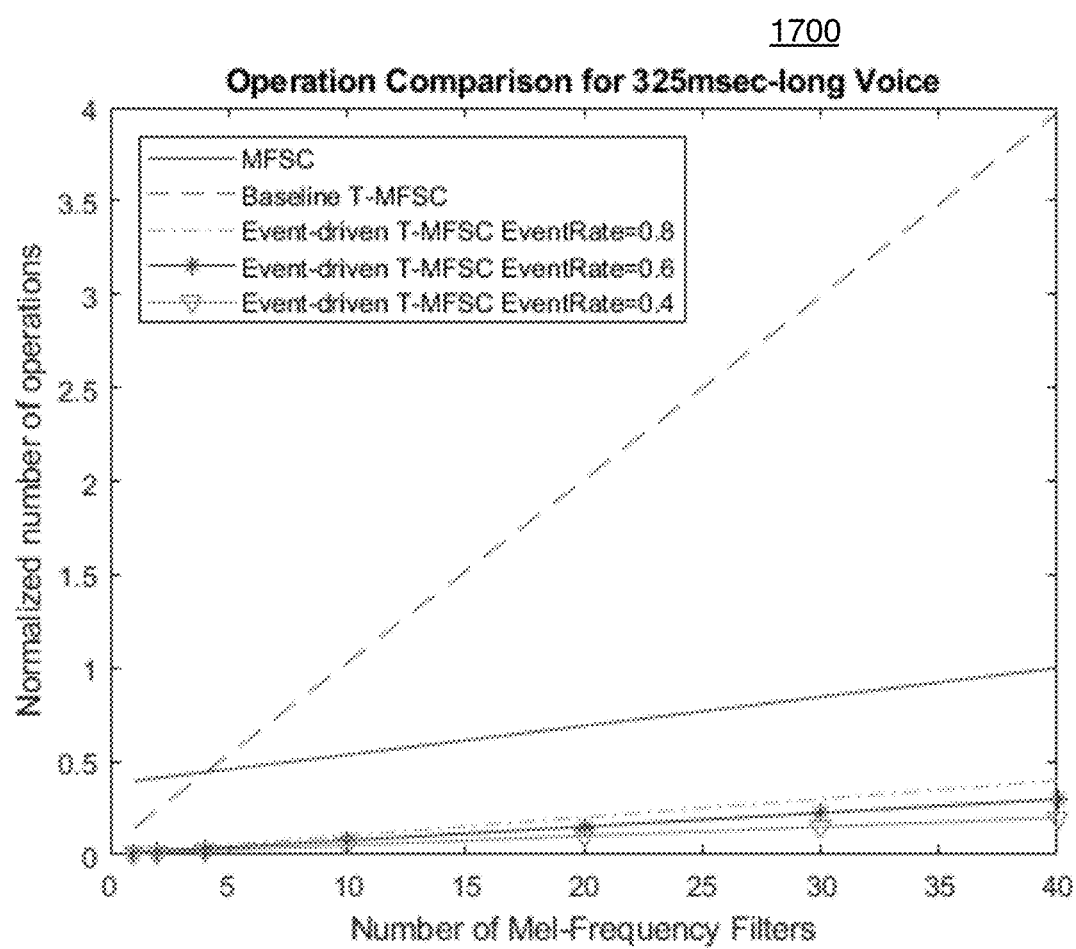
FIG. 17 is a graph showing the number of computations per mel-frequency filter for frequency-domain and temporal-domain mel-spaced filters according to at least one of the implementations herein.

Referring to FIG. 17, a graph 1700 compares the number of operations required by conventional MFSC, the present baseline T-MFSC, and the present T-MFSC with multi-level delta-modulation, across different numbers of mel-frequency filters and different event rates. The event rate is defined as whether data changes in two adjacent samples and as [events]/[number of total samples]. It is shown that T-MFSC has efficient scaling as the number of operations in T-MFSC becomes larger with increase in event rate as well as with the number of filters, whereas the number of operations in conventional MFSC is independent of event rate, and has a moderate to low efficiency with scaling when the number of filters is increased, mainly due to the computational load of FFT operations. For example, for 40 filters and event rate=0.4, T-MFSC requires a fifth of the computations compared to conventional MFSC. The baseline MFSC shows a higher computational load as mel-frequency filters. As mentioned above, the advantage of the baseline

TABLE 2

Memory requirement of example cases of MFSC and T-MFSC for number of filters ($N_F$) = 40, number of taps ($M_{tap}$) = 50, sampling frequency = 16 kHz, and 25 msec-long frame.

MEMORY USAGE (unit = Byte)

| | MFSC | T-MFSC | T-MFSC (using shared coefficients) |
|---|---|---|---|
| Input Buffer | 560 (35 ms × 16 kHz × 8b) | X | X |
| FFT Coefficients | 512 (256 × 2) | X | X |
| FFT buffer for intermediate value | 1556 (512 × 3) | X | X |
| Mel-frequency Filters | 10240 (256 × $N_F$) | — | — |
| FIR Filter Coefficients | — | 2000 ($M_{tap} \times N_F \times$ P/8b) | 1000 ($M_{tap} \times N_F \times \log_2 N_{SC}$/8b for $N_{SC}$ = 16) |
| Feature Output Buffer | 40 ($N_F$) | 40 ($N_F$) for $N_F$ = 40 | 40 ($N_F$) for $N_F$ = 40 |
| Context Buffer | 1240 ($N_F \times N_{frame,OV}$) | 520 ($N_F \times N_{frame,non-OV}$) | 520 ($N_F \times N_{frame,non-OV}$) |
| Total | 20520 | 2560 | 1560 |

MFSC is the reduction of power when neural network processor(s) are used, in comparison to power consumption of a generic DSP executing conventional MFSC.

It will be appreciated that processes 300 and/or 600 may be provided by sample ASR systems 10, 400, 500, 700, 800, 900, 1100, 1200, 1400, 1800, 1900, and/or 2000 to operate at least some implementations of the present disclosure. In addition, any one or more of the operations of FIGS. 3 and 6A-6B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 18:
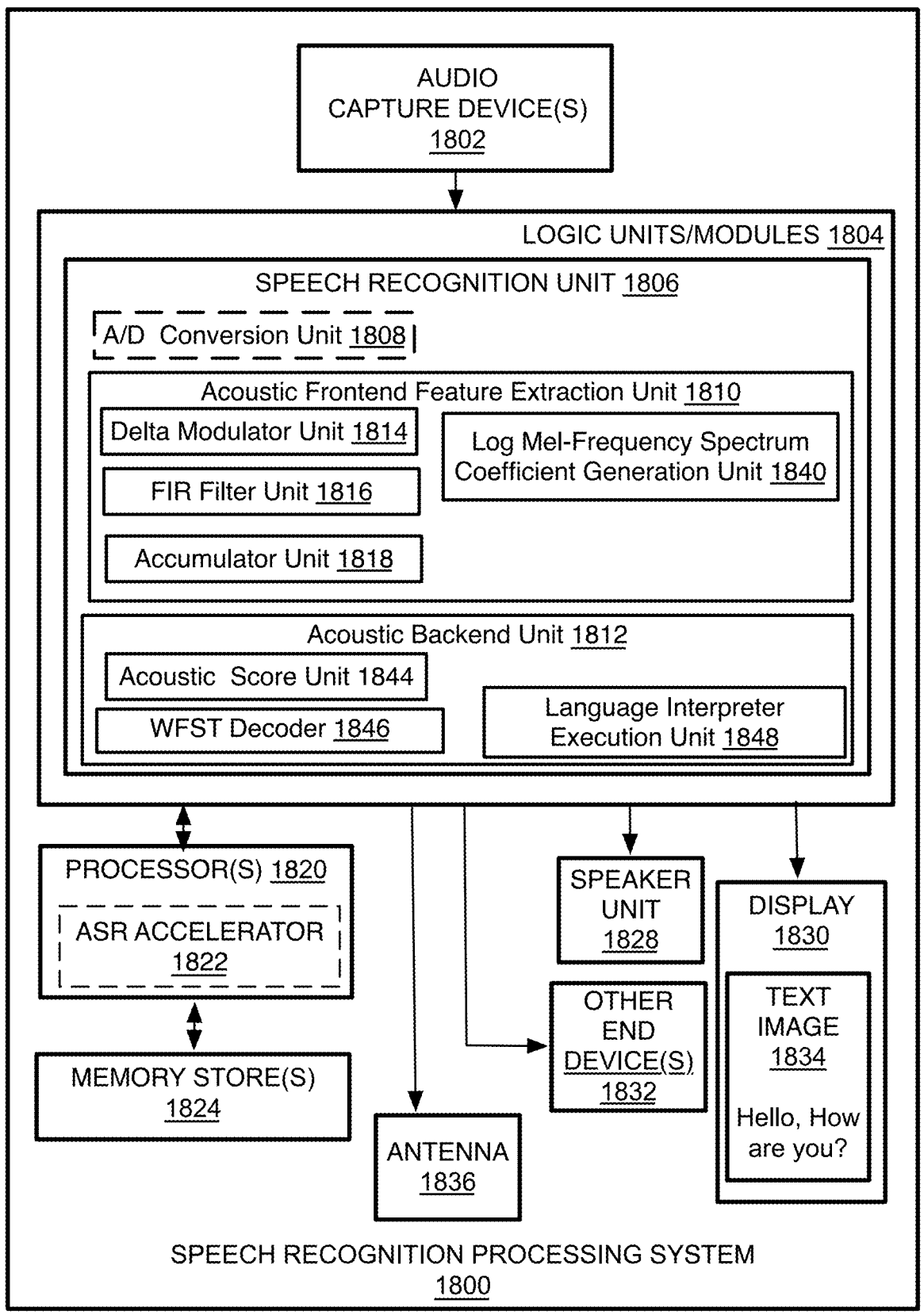
FIG. 18 is an illustrative diagram of an example system.

Referring to FIG. 18, an example speech recognition processing system 1800 is arranged in accordance with at least some implementations of the present disclosure. In various implementations, the example speech recognition processing system 1800 may have an audio capture device(s) 1802 to form or receive acoustical signal data. This can be implemented in various ways. Thus, in one form, the speech recognition processing system 1800 may be an audio capture device such as a microphone, and audio capture device 1802, in this case, may be the microphone hardware and sensor software, module, or component. In other examples, speech recognition processing system 1800 may have an audio capture device 1802 that includes or may be a microphone, and logic modules 1804 may communicate remotely with, or otherwise may be communicatively coupled to, the audio capture device 1802 for further processing of the acoustic data.

In either case, such technology may include a telephone, a smart phone, a dictation machine, other sound recording machine, a mobile device or an on-board device, wearables such as a smart watch, smart glasses, or exercise band, or any combination of these. Thus, in one form, audio capture device 1802 may include audio capture hardware including one or more sensors as well as actuator controls. These controls may be part of a sensor module or component for operating the sensor. The sensor component may be part of the audio capture device 1802, or may be part of the logical modules 1804 or both. Such sensor component can be used to convert sound waves into an electrical acoustic signal. The audio capture device 1802 also may have an A/D converter, other filters, and so forth to provide a digital signal for speech recognition processing.

In the illustrated example, the logic modules 1804 may include a speech recognition unit 1806 that may have an A/D conversion (ADC) unit 1808, or the ADC unit may be part of the audio capture device 1802 instead. By another option, the ADC is not provided, and an acoustic front-end unit 1810 performs the ADC instead, the acoustic front-end unit 1810 may perform other pre-processing audio tasks as well. The acoustic frontend feature extraction unit 1810 may have a delta modulator unit 1814, a FIR filter unit 1816, an accumulator unit 1818 to perform the Parseval Theorem-based energy operation, and a Mel-frequency spectrum coefficient generation unit 1840 that provides the feature extraction in the form of the coefficients, all as described above.

Also, an acoustic backend unit 1812 may have an acoustic score unit 1844 that provides acoustic scores for the acoustic features, a WFST decoder 1846 to provide hypothetical word sequences, and a language interpreter execution unit 1848 that determines the user intent based on the output of the WFST decoder. The logic modules may be communicatively coupled to the components of the audio capture device 1802 in order to receive raw acoustic data. The logic modules 1804 may or may not be considered to be part of the audio capture device.

These units that form the logic units 1804 may perform the operations described above that are relevant to the title of the units here, and may be provided alternatively according to the options provided above. Other units may be provided as well, such as a DCT unit, to accomplish the feature extraction described herein.

The speech recognition processing system 1800 may have one or more processors 1820 which may include a dedicated accelerator 1822 such as the Intel Atom, memory stores 1824 which may or may not hold various versions of the speech input signal as described herein. The accelerator could be formed of fixed function processor(s), generic DSPs, or neural network processor(s) as mentioned above. The system also may have at least one speaker unit 1828 to provide auditory responses, one or more displays 1830 to provide images 1834 of text as a visual response to the acoustic signals, other end device(s) 1832 to perform actions in response to the acoustic signal, and antenna 1836. In one example implementation, the speech processing system 1800 may have the display 1830, at least one processor 1820 communicatively coupled to the display, and at least one memory 1824 communicatively coupled to the processor. The antenna 1836 may be provided for transmission of the best word sequence matched or the input acoustic signal or other relevant commands to other devices that may act upon such a determination. Otherwise, the results of the speech recognition process may be stored in memory 1824. As illustrated, any of these components may be capable of communication with one another and/or communication with portions of logic modules 1804 and/or audio capture device 1802. Thus, processors 1820 may be communicatively coupled to both the audio capture device 1802 and the logic modules 1804 for operating those components. By one approach, although speech processing system 1800, as shown in FIG. 18, may include one particular set of blocks or actions associated with particular components or modules, these blocks or actions may be associated with different components or modules than the particular component or module illustrated here.

Figure 19:
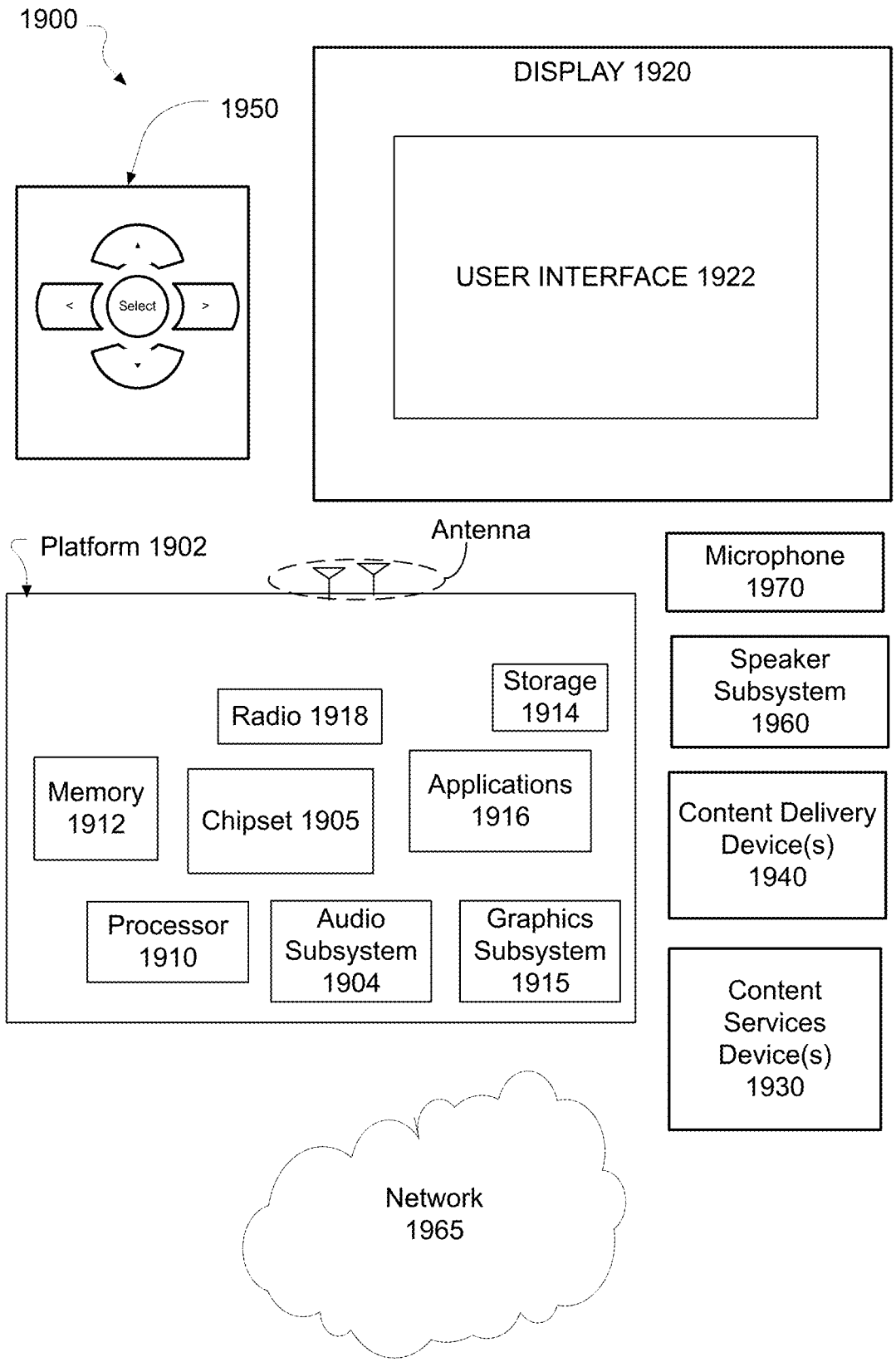
FIG. 19 is an illustrative diagram of another example system.

Referring to FIG. 19, an example system 1900 in accordance with the present disclosure operates one or more aspects of the speech processing system described herein. It will be understood from the nature of the system components described below that such components may be associated with, or used to operate, certain part or parts of the speech processing system described above. In various implementations, system 1900 may be a media system although system 1900 is not limited to this context. For example, system 1900 may be incorporated into a microphone, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (smart watch, smart glasses, exercise band), mobile internet device (MID), messaging device, data communication device, and so forth.

In various implementations, system 1900 includes a platform 1902 coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902, speaker 1960, microphone 1970, and/or display 1920. Each of these components is described in greater detail below.

In various implementations, platform 1902 may include any combination of a chipset 1905, processor 1910, memory 1912, storage 1914, audio subsystem 1904, graphics subsystem 1915, applications 1916 and/or radio 1918. Chipset 1905 may provide intercommunication among processor 1910, memory 1912, storage 1914, audio subsystem 1904, graphics subsystem 1915, applications 1916 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Audio subsystem 1904 may perform processing of audio such as acoustic signals for speech recognition as described herein and/or voice recognition. The audio subsystem 1904 may comprise one or more processing units and accelerators. Such an audio subsystem may be integrated into processor 1910 or chipset 1905. In some implementations, the audio subsystem 1904 may be a stand-alone card communicatively coupled to chipset 1905. An interface may be used to communicatively couple the audio subsystem 1904 to a speaker 1960, microphone 1970, and/or display 1920.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, Display Port, wireless HDMI, and/or wireless HD compliant techniques. Graphics subsystem 1915 may be integrated into processor 1910 or chipset 1905. In some implementations, graphics subsystem 1915 may be a stand-alone card communicatively coupled to chipset 1905.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display, or any smartphone type display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920, speaker 1960, and microphone 1970. Platform 1902 and/or content services device(s) 1930 may be coupled to a network 1965 to communicate (e.g., send and/or receive) media information to and from network 1965. Content delivery device(s) 1940 also may be coupled to platform 1902, speaker 1960, microphone 1970, and/or to display 1920.

In various implementations, content services device(s) 1930 may include a microphone, a cable television box, personal computer, network, telephone, Internet enabled devices or appliance capable of delivering digital information and/or content, and any other similar device capable of unidirectionally or bidirectionally communicating content between content providers and platform 1902 and speaker subsystem 1960, microphone 1970, and/or display 1920, via network 1965 or directly. It will be appreciated that the content may be communicated unidirectionally and/or bidirectionally to and from any one of the components in system 1900 and a content provider via network 1965. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of controller 1950 may be used to interact with user interface 1922, for example. In implementations, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1904 also may be used to control the motion of articles or selection of commands on the interface 1922.

Movements of the navigation features of controller 1950 may be replicated on a display (e.g., display 1920) by movements of a pointer, cursor, focus ring, or other visual indicators displayed on the display or by audio commands. For example, under the control of software applications 1916, the navigation features located on navigation controller 1950 may be mapped to virtual navigation features displayed on user interface 1922, for example. In implementations, controller 1950 may not be a separate component but may be integrated into platform 1902, speaker subsystem 1960, microphone 1970, and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example, or by auditory command. Program logic may allow platform 1902 to stream content to media adaptors or other content services device(s) 1930 or content delivery device(s) 1940 even when the platform is turned "off." In addition, chipset 1905 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various implementations, platform 1902, speaker 1960, microphone 1970, and/or display 1920 may be an integrated unit. Display 1920, speaker 1960, and/or microphone 1970 and content service device(s) 1930 may be integrated, or display 1920, speaker 1960, and/or microphone 1970 and content delivery device(s) 1940 may be integrated, for example. These examples are not meant to limit the present disclosure.

In various implementations, system 1900 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 19.

Figure 20:
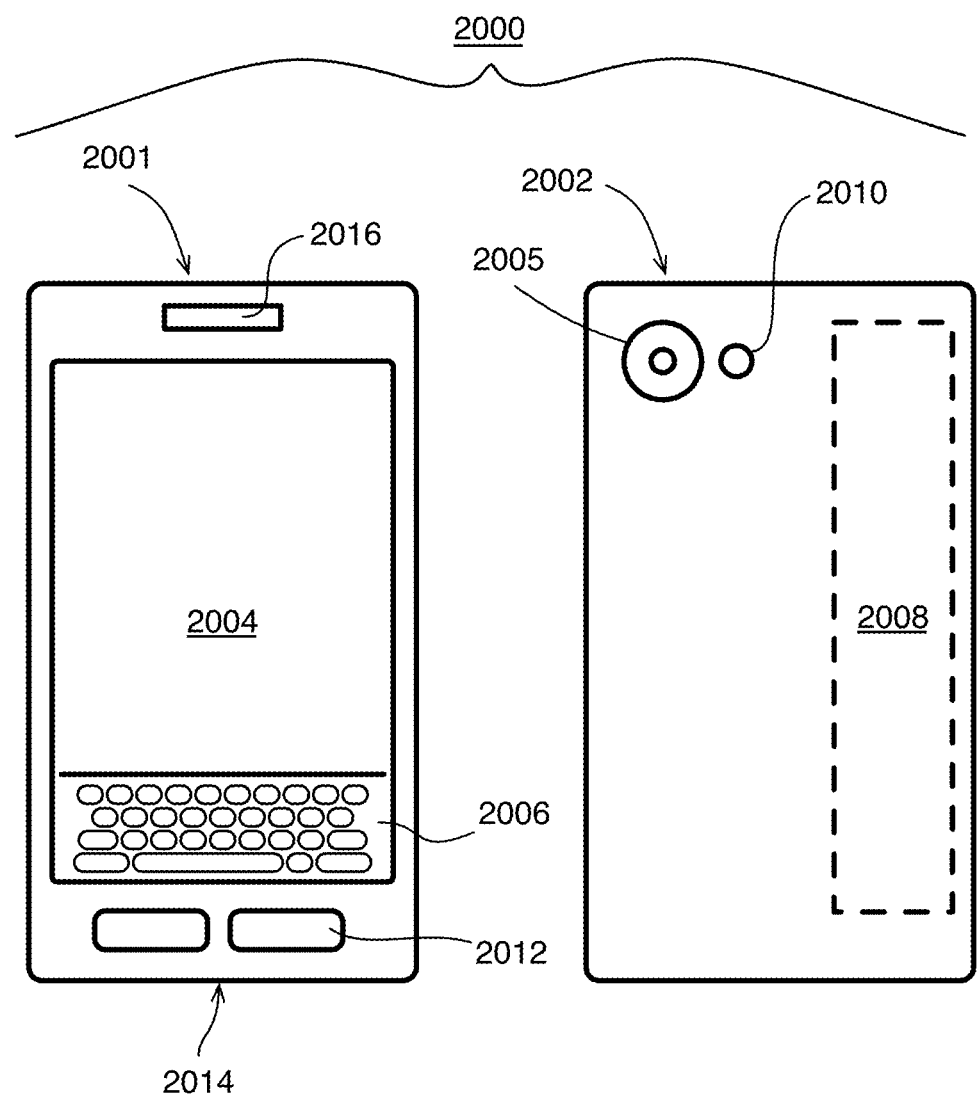
FIG. 20 illustrates another example device, all arranged in accordance with at least some implementations of the present disclosure.

Referring to FIG. 20, a small form factor device 2000 is one example of the varying physical styles or form factors in which system 1800 or 1900 may be embodied. By this approach, device 2000 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultralaptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, any other on-board (such as on a vehicle) computer, internet-of-things (IoT), specific purpose audio command system, and so forth, that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 20, device 2000 may include a housing with a front 2001 and a back 2002, a display 2004 including a screen 2010, an input/output (I/O) device 2006, and an antenna 2008. Device 2000 also may include navigation features 2012. Display 2004 may include any suitable display unit for displaying information appropriate for a mobile computing device. I/O device 2006 may include any suitable I/O device for entering information into a mobile computing device. Examples for I/O device 2006 may include an alphanumeric keyboard, a numeric keypad, a touch pad, input keys, buttons, switches, rocker switches, software and so forth. Information also may be entered into device 2000 by way of microphone 2014. Such information may be digitized by a speech recognition device as described herein as well as a voice recognition device, and as part of the device 2000, and may provide audio responses via a speaker 2016 or visual responses via screen 2004. The implementations are not limited in this context. The housing also may include a camera 2005 and an illuminator 2010.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of feature extraction for automatic speech recognition, comprises receiving an input speech signal; performing delta-modulation comprising: comparing a representative value of a sample of the input speech signal to upper and lower thresholds of multiple threshold levels; providing at least a valid indicator and a shift indicator as output of the delta-modulation, wherein the valid indicator indicates a change in at least one threshold level along the input speech signal from a previous representative value to the next sample, and wherein the shift indicator is a single value indicating the total amount of change in threshold levels including a change in multiple levels associated with the valid indicator and from the previous representative value to the next sample; and using the valid and shift indicators to form mel-frequency related coefficients to be used to recognize speech in the input speech signal.

By another implementation, the method also may comprise determining the feature extraction without using Fourier transform to provide frequency-domain signal data to perform mel-scale filtering; converting an analog input speech signal into a digital signal by performing the delta-modulation; wherein the comparing comprises performing the comparisons in a discrete time domain comprising synchronous multiple comparisons of the representative value of the input speech signal to thresholds of multiple levels during the same sample and by the use of a clock, wherein the sampling rate and the comparison rate is at least partly based on the Nyquist sampling theorem, wherein performing delta-modulation comprises performing the delta-modulation on a continuous stream of the input speech signal without dividing and storing the input speech signal into frames before or during the delta-modulation, wherein the total number of multiple levels is a number of threshold levels expected to cover a range of human speech frequencies, and wherein the total number of multiple levels is at least two levels both with upper and lower thresholds.

The method also may comprise computing the representative value as a difference between a signal value of a sample and an accumulation of sample parameter terms individually associated with a different sample, wherein the individual sample parameter terms factor the shift indicator of the sample associated with the sample parameter term, wherein the individual sample parameter terms factor the valid indictor, wherein the individual sample parameter terms factor a direction indicator that indicates whether the input speech signal is falling or rising from sample to sample; performing finite impulse response (FIR) filtering comprising modifying mel-frequency coefficients wherein the amount of modification depends on the shift indicator; and performing a Parseval Theorem-related energy operation comprising using FIR filter outputs generated by using the shift and valid indicators and to form intermediate coefficients to be used to form mel-frequency spectrum coefficients (MFSCs) or mel-frequency cepstrum coefficients (MFCCs) to be used to recognize words in the speech.

By yet another implementation, a computer-implemented system of feature extraction for automatic speech recognition comprises at least one processor; memory communicatively coupled to the at least one processor; at least one mel-frequency finite impulse response (FIR) filter operated by the at least one processor and arranged to obtain audio data of an acoustic input signal, the audio data including human speech, and the mel-frequency FIR filter outputting sums of modified mel-frequency coefficients; and an accumulator unit to perform a Parseval Theorem-related energy operation comprising using the filter outputs to form intermediate coefficients to be used to form mel-frequency spectrum coefficients (MFSCs) or mel-frequency cepstrum coefficients (MFCCs) to be used to recognize words in the speech.

By another example, the system provides that wherein the energy operation generates magnitude sums of the filter outputs without performing a square of the filter outputs; and the system has a feature extraction unit that comprises the at least one FIR filter and the accumulator unit, the feature extraction unit arranged to operate by: performing delta-modulation comprising: comparing a representative value of a sample of the input speech signal to upper and lower thresholds of multiple threshold levels; and providing at least a valid indicator and a shift indicator as output of the delta-modulation, wherein the valid indicator indicates a change in at least one threshold level along the input speech signal from a previous representative value to the next sample, and wherein the shift indicator is a single value indicating the total amount of change in threshold levels including a change in multiple levels associated with the valid indicator and from the previous representative value to the next sample; and using the change and shift indicators to form mel-frequency related coefficients to be used to recognize the speech in the input speech signal, wherein the at least one mel-frequency finite impulse response (FIR) filter has an array of branches with individual branches arranged to apply a different mel-frequency tap associated with a mel-frequency coefficient, wherein the individual branches permit a modified mel-frequency coefficient to be used in a sum of modified mel-frequency taps from multiple branches and the sum to be an output of the FIR filter, wherein the modified frequency coefficient of an individual branch is used in the sum when the valid indicator of the individual branch indicates a change in the input speech signal has occurred, wherein the individual branches receive the shift indicator to modify a mel-frequency tap without using multiplication.

By one approach, at least one computer readable medium comprises a plurality of instructions that in response to being executed on a computing device, causes the computing device to operate by: obtaining a valid indicator that indicates a change in at least one threshold level along an input speech signal and from a previous representative value of the input speech to a next sample of the input speech signal, and obtaining a shift indicator that is a single value indicating the total amount of change in threshold levels including a change in multiple levels associated with the valid indicator and from the previous representative value to the next sample; and depending on a value of the valid indicator, using at least one modified mel-frequency coefficient of an FIR filter to form filter outputs to be used to recognize speech in the input speech signal, wherein the FIR filter is arranged to modify the mel-frequency coefficient(s) by using the shift indicator.

By another approach, the instructions cause the computing device to operate by performing delta-modulation comprising: comparing a representative value of a sample of the input speech signal to upper and lower thresholds of multiple threshold levels to form the valid and shift indicators, wherein the instructions cause the computing device to operate by determining a binary shift of a mel-frequency tap during mel-frequency filtering comprising determining the amount of binary shift depending on the shift indicator, wherein the instructions cause the computing device to operate by sharing delay-taps at delay elements of a plurality of the mel-frequency filters, wherein the delay elements control propagation of indicators from branch to branch of the mel-frequency filter wherein individual branches have a different mel-frequency coefficient of the mel-frequency filter, and the delay-taps are indicator values used at the delay elements, wherein the instructions cause the computing device to operate by sharing mel-frequency coefficients among multiple mel-frequency filters, wherein the instructions cause the computing device to operate by time-multiplexing an arithmetic logic unit (ALU) to perform at least a binary shift of mel-frequency coefficients or summation of shifted mel-frequency coefficients or both across multiple mel-frequency filters, wherein the time-multiplexing comprises operating the ALU at an ALU frequency faster than, and relative to, an input speech signal sampling frequency, wherein the ALU frequency being set by factoring a number of mel-frequency filters and a number of taps in the mel-frequency filters.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of feature extraction for automatic speech recognition, comprising:
receiving an input speech signal;
performing, by at least one processor, delta-modulation comprising:
comparing a representative value of a sample of the input speech signal to upper and lower thresholds of multiple threshold levels;
providing at least a valid indicator and a shift indicator as output of the delta-modulation,
wherein the valid indicator indicates a change in at least one threshold level along the input speech signal from a previous representative value to the next sample, and
wherein the shift indicator is a single value indicating the total amount of change in threshold levels in a single direction up to the total amount of thresholds available and being a change in multiple levels associated with the valid indicator and from the previous representative value to the next sample;
forming, by at least one processor, mel-frequency related coefficients comprising using the valid and shift indicators; and
recognizing, by at least one processor, speech in the input speech signal comprising generating utterance hypothesis
depending, at least in part, on probability scores of context-dependent phonemes formed by using the mel-frequency related coefficients.

2. The method of claim 1 comprising determining the feature extraction without using Fourier transform to provide frequency-domain signal data to perform mel-scale filtering.

3. The method of claim 1 comprising converting an analog input speech signal into a digital signal by performing the delta-modulation.

4. The method of claim 1 wherein the comparing comprises performing the comparisons in a discrete time domain comprising synchronous multiple comparisons of the representative value of the input speech signal to thresholds of multiple levels during the same sample and by the use of a clock.

5. The method of claim 1 wherein a sampling rate and a comparison rate are at least partly based on the Nyquist sampling theorem.

6. The method of claim 1 wherein performing delta-modulation comprises performing the delta-modulation on a continuous stream of the input speech signal without dividing and storing the input speech signal into frames before or during the delta-modulation.

7. The method of claim 1 wherein the total number of multiple levels is a number of threshold levels expected to cover a range of human speech frequencies.

8. The method of claim 1 wherein the total number of multiple levels is at least two levels both with upper and lower thresholds.

9. The method of claim 1 comprising computing the representative value as a difference between a signal value of a sample and an accumulation of sample parameter terms individually associated with a different sample, wherein the individual sample parameter terms factor the shift indicator of the sample associated with the sample parameter term.

10. The method of claim 9 wherein the individual sample parameter terms factor the valid indictor.

11. The method of claim 10 wherein the individual sample parameter terms factor a direction indicator that indicates whether the input speech signal is falling or rising from sample to sample.

12. The method of claim 1 comprising performing finite impulse response (FIR) filtering comprising modifying mel-frequency coefficients wherein the amount of modification depends on the shift indicator.

13. The method of claim 1 comprising performing a Parseval Theorem-related energy operation comprising using FIR filter outputs generated by using the shift and valid indicators and to form intermediate coefficients to be used to form mel-frequency spectrum coefficients (MFSCs) or mel-frequency cepstrum coefficients (MFCCs) to be used to recognize words in the speech.

14. At least one non-transitory computer readable medium comprising a plurality of instructions that in response to being executed on a computing device, causes the computing device to operate by:
obtaining, by at least one processor, a valid indicator that indicates a change in at least one threshold level along an input speech signal and from a previous representative value of the input speech to a next sample of the input speech signal, and
wherein the shift indicator is a single value indicating the total amount of change in threshold levels in a single direction up to the total amount of thresholds available and being a change in multiple levels associated with the valid indicator and from the previous representative value to the next sample; and
depending on a value of the valid indicator, using a t least one modified mel-frequency coefficient of a FIR filter to form filter outputs to be used to recognize speech in the input speech signal, wherein the FIR filter is arranged to modify the mel-frequency coefficient(s) by using the shift indicator;
forming, by at least one processor, mel-frequency related coefficients comprising using the valid and shift indicators; and
recognizing, by at least one processor, speech in the input speech signal comprising generating utterance hypothesis depending, at least in part, on probability scores of context-dependent phonemes formed by using the mel-frequency related coefficients.

15. The medium of claim 14 wherein the instructions cause the computing device to operate by performing delta-modulation comprising:
comparing a representative value of a sample of the input speech signal to upper and lower thresholds of multiple threshold levels to form the valid and shift indicators.

16. The medium of claim 14 wherein the instructions cause the computing device to operate by determining a binary shift of a mel-frequency tap during mel-frequency filtering comprising determining the amount of binary shift depending on the shift indicator.

17. The medium of claim 14 wherein the instructions cause the computing device to operate by sharing delay-taps at delay elements of a plurality of the mel-frequency filters, wherein the delay elements control propagation of indicators from branch to branch of the mel-frequency filter wherein individual branches have a different mel-frequency coefficient of the mel-frequency filter, and the delay-taps are indicator values used at the delay elements.

18. The medium of claim 14 wherein the instructions cause the computing device to operate by sharing mel-frequency coefficients among multiple mel-frequency filters.

19. The medium of claim 14 wherein the instructions cause the computing device to operate by time-multiplexing an arithmetic logic unit (ALU) to perform at least a binary shift of mel-frequency coefficients or summation of shifted mel-frequency coefficients or both across multiple mel-frequency filters, wherein the time-multiplexing comprises operating the ALU at an ALU frequency faster than, and relative to, an input speech signal sampling frequency, wherein the ALU frequency being set by factoring a number of mel-frequency filters and a number of taps in the mel-frequency filters.

* * * * *